US012795758B2

(12) United States Patent
Jung et al.

(10) Patent No.: US 12,795,758 B2
(45) Date of Patent: Nov. 10, 2026

(54) ELECTRONIC DEVICE FOR WLAN COMMUNICATION AND OPERATING METHOD THEREOF

(71) Applicant: SAMSUNG ELECTRONICS CO., LTD., Suwon-si (KR)

(72) Inventors: Buseop Jung, Suwon-si (KR); Junsung Kim, Suwon-si (KR); Soonho Lee, Suwon-si (KR); Wonjun Jang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 235 days.

(21) Appl. No.: 18/782,024

(22) Filed: Jul. 24, 2024

(65) Prior Publication Data

US 2025/0056634 A1 Feb. 13, 2025

Related U.S. Application Data

(63) Continuation of application No. PCT/KR2024/009506, filed on Jul. 4, 2024.

(30) Foreign Application Priority Data

Aug. 8, 2023 (KR) ........................ 10-2023-0103364
Oct. 4, 2023 (KR) ........................ 10-2023-0131659

(51) Int. Cl.
*H04W 4/00* (2018.01)
*H04W 76/14* (2018.01)
(Continued)

(52) U.S. Cl.
CPC .......... *H04W 76/14* (2018.02); *H04W 76/34* (2018.02); *H04W 84/12* (2013.01)

(58) Field of Classification Search
CPC ..... H04W 76/14; H04W 76/34; H04W 84/12; H04W 4/80; H04W 8/00; H04W 48/20; H04W 88/06
See application file for complete search history.

(56) References Cited

U.S. PATENT DOCUMENTS 9,100,984 B2 8/2015 Kim et al.
10,849,171 B2 11/2020 Iwami et al.
(Continued)

FOREIGN PATENT DOCUMENTS

EP 2688319 B1 * 4/2017 ............ H04W 76/14
EP 2936748 B1 10/2018
(Continued)

OTHER PUBLICATIONS

International Search Report mailed Oct. 8, 2024 for PCT/KR2024/009506.

(Continued)

*Primary Examiner* — Thai Dinh Hoang
(74) *Attorney, Agent, or Firm* — CANTOR COLBURN LLP

(57) ABSTRACT

An embodiment of the disclosure relates to a device and a method for wireless LAN communication in an electronic device. The electronic device includes a communication circuit configured to support a wireless LAN communication, at least one processor and a memory storing instructions which cause, when executed by the at least one processor, the electronic device to allow to be configured as a group client for direct communication with an external electronic device configured as a group owner, and in a state in which a first connection for the direct communication with the external electronic device has been established through a first communication protocol of the communication circuit and the external electronic device supports a cross connection, establish a second connection with the (Continued)

external electronic device for communication with an external network through a first AP to which the external electronic device is connected.

20 Claims, 12 Drawing Sheets

(51) Int. Cl.
*H04W 76/34* (2018.01)
*H04W 84/12* (2009.01)

(56) References Cited

U.S. PATENT DOCUMENTS 10,949,143 B2 3/2021 Kimura
2005/0030955 A1* 2/2005 Galin .................... H04M 3/229 370/401
2012/0106475 A1 5/2012 Jung
2013/0044615 A1* 2/2013 Carrera ............... H04W 72/569 370/336
2014/0085666 A1 3/2014 Park
2014/0177472 A1 6/2014 Halasz et al.
2014/0219194 A1 8/2014 Varoglu et al.
2014/0355437 A1* 12/2014 Damodaran ........ H04W 28/082 370/232
2014/0355527 A1* 12/2014 Vaidya .................. H04W 76/15 370/329
2016/0360349 A1 12/2016 Goto
2016/0380665 A1* 12/2016 Lee ....................... H04W 76/10 455/552.1
2018/0199392 A1 7/2018 Jung et al.
2018/0317154 A1 11/2018 Sun et al.
2021/0400691 A1 12/2021 Nakajima
2026/0101200 A1* 4/2026 Abhishek .............. H04W 24/02

FOREIGN PATENT DOCUMENTS

JP 6558965 B2 8/2019
JP 6897566 B2 6/2021
JP 7016705 B2 2/2022
KR 20120043893 A 5/2012
KR 20140040584 A 4/2014
KR 101867089 B1 6/2018
KR 20230050155 A 4/2023
WO 2019009059 A1 1/2019

OTHER PUBLICATIONS

Wi-Fi Alliance: "Wi-Fi Direct Specification Version 1.9", pp. 1-200, XP093324988, Oct. 2, 25021URL: https://www.wi-fi.org/system/files/Wi-Fi_Direct_Specification_v1.9.pdf.
The extended European search report for EP Application No. 24852078.5 mailed on Jul. 14, 2026, citing the above reference(s).

* cited by examiner

ELECTRONIC DEVICE FOR WLAN COMMUNICATION AND OPERATING METHOD THEREOF

CROSS-REFERENCE TO RELATED APPLICATIONS

This application is a continuation application, claiming priority under § 365 (c), of an International application No. PCT/KR2024/009506, filed on Jul. 4, 2024, which is based on and claims the benefit of a Korean patent application number 10-2023-0103364, filed on Aug. 8, 2023, in the Korean Intellectual Property Office, and of a Korean patent application number 10-2023-0131659, filed on Oct. 4, 2023, in the Korean Intellectual Property Office, the disclosure of each of which is incorporated by reference herein in its entirety.

BACKGROUND

Technical Field

An embodiment of the disclosure relates to an electronic device for wireless local area network communication and an operating method thereof.

Background Art

A wireless local area network (WLAN) system may support a wireless connection between various electronic devices, such as a smartphone, tablet personal computer, or laptop by using a designated frequency band (e.g., about 2.4 GHz band, about 5 GHz band, and/or about 6 GHz band).

The WLAN system may be installed in private spaces, such as homes, as well as in public spaces, such as airports, train stations, offices, or department stores. The WLAN system may be defined in the Institute of Electrical and Electronics Engineers (IEEE) 802.11 standard. For example, IEEE 802.11 standards are constantly evolving, such as IEEE 802.11b, IEEE 802.11a, IEEE 802.11g, IEEE 802.11n, IEEE 802.11ac, IEEE 802.11ax, and IEEE 802.11be. Terminologies used herein may have the same meanings as defined in IEEE 802.11 standards, depending on the context.

SUMMARY

An electronic device may share, through direct communication (e.g., Wi-Fi direct), a content, such as photos, videos, or games, with an external electronic device based on WLAN communication. For example, the "direct communication based on WLAN communication" is a technology providing a peer-to-peer (P2P) protocol connection method to directly connect communication between electronic devices that support a WLAN without network infrastructure equipment (e.g., an access point (AP), hotspot, or router).

When supporting a "concurrent communication mode", the electronic device may perform at least one of transmission or reception of data to or from an AP through a wireless connection with the AP by using WLAN communication while performing direct communication with an external electronic device based on WLAN communication. For example, in case that a channel for a wireless connection with the AP is identical to a channel for direct communication with the external electronic device, the electronic device may transmit or receive data to or from at least one of the external electronic device or the AP by using the same channel.

However, in case that a channel for a wireless connection with the AP is different from a channel for direct communication with the external electronic device, the electronic device may not concurrently transmit or receive data to or from the external electronic device and the AP. In case that the electronic device provides a low latency service (e.g., mirroring), such as real-time screen transmission through direct communication with the external electronic device, communication with the AP may cause the quality of a screen transmitted or received in real time to or from the external electronic device to deteriorate or a screen to be disconnected.

At least one of the electronic device or the external electronic device performing wireless LAN-based direct communication may experience loss of direct communication or connection to the AP. For example, in case that a channel for a wireless connection of a first AP with the electronic device, a channel for direct communication of the electronic device and the external electronic device, and a channel for a wireless connection of a second AP with the external electronic device are different from each other, a loss of a beacon frame may cause the loss of at least one of the wireless connection between the electronic device and the first AP, the direct communication between the electronic device and the external electronic device, or the wireless connection between the external electronic device and the second AP.

An embodiment of the disclosure provides a device and method for providing concurrent communication based on a wireless LAN in an electronic device.

The technical subjects pursued in the disclosure may not be limited to the above-mentioned technical subjects, and other technical subjects which are not mentioned may be clearly understood, through the following descriptions, by those skilled in the art to which the disclosure pertains.

According to an embodiment, the electronic device includes a communication circuit configured to support a wireless LAN communication, at least one processor, comprising processing circuitry, operatively connected to the communication circuit, and a memory operatively connected to the at least one processor. According to an embodiment, the memory stores instructions which, when executed by the at least one processor, individually and/or collectively, cause the electronic device to be configured as a group client for direct communication with the external electronic device configured as a group owner. According to an embodiment, the memory stores instructions which, when executed by the at least one processor, individually and/or collectively, cause the electronic device to, in a state in which a first connection for the direct communication with the external electronic device has been established through a first communication protocol of the communication circuit and the external electronic device supports a cross connection, establish a second connection with the external electronic device for communication with an external network through a first AP to which the external electronic device is connected.

According to an embodiment, an operating method of an electronic device includes an operation of configuring the electronic device as a group client for direct communication with an external electronic device configured as a group owner. According to an embodiment, the operating method of the electronic device includes an operation of establishing, in a state in which a first connection for the direct communication with the external electronic device has been established through a first communication protocol and the external electronic device supports a cross connection, a second connection with the external electronic device for communication with an external network through a first AP to which the external electronic device is connected.

According to an embodiment, a non-transitory computer-readable storage medium (or computer program product) configured to store one or more programs will be described. According to an embodiment, the one or more programs may include instructions performing, when executed by a processor of an electronic device, an operation of configuring the electronic device as a group client for direct communication with an external electronic device configured as a group owner, and an operation of establishing, in a state in which a first connection for direct communication with the external electronic device has been established through a first communication protocol and the external electronic device supports a cross connection, a second connection with the external electronic device for communication with an external network through a first AP to which the external electronic device is connected.

According to an embodiment, the electronic device includes a communication circuit configured to support a wireless LAN communication, at least one processor, comprising processing circuitry, operatively connected to the communication circuit, and a memory operatively connected to the at least one processor. According to an embodiment, the memory stores instructions which, when executed by the at least one processor, individually and/or collectively, cause the electronic device to be configured as a group owner for direct communication with the external electronic device configured as a group client. According to an embodiment, the memory stores instructions which, when executed by the at least one processor, individually and/or collectively, cause the electronic device to, in a state in which a first connection for the direct communication with the external electronic device has been established through a first communication protocol of the communication circuit and the electronic device supports a cross connection, establish a second connection with the external electronic device for communication with an external network through a first AP to which the electronic device is connected.

According to an embodiment of the disclosure, in case of performing a connection based on a wireless LAN for direct communication with an external electronic device in an electronic device, concurrent communication based on a wireless LAN may be stably provided by performing an additional connection with the external electronic device for communication of the external electronic device with an external network.

According to an embodiment, in case of performing a connection based on a wireless LAN for direct communication with the external electronic device in a state in which wireless communication is connected to the external network (e.g., a wireless LAN network or cellular network) in the electronic device, concurrent communication based on a wireless LAN may be stably provided by configuring at least one of a channel for direct communication with the external electronic device or a channel for an additional connection with the external electronic device, based on a channel for wireless communication with the external network.

Advantageous effects obtainable from various embodiments of the disclosure may not be limited to the above-mentioned effects, and other effects which are not mentioned may be clearly understood, through the following descriptions, by those skilled in the art to which the disclosure pertains.

BRIEF DESCRIPTION OF DRAWINGS

In describing the drawings, identical or similar reference numerals may be used to designate identical or similar elements. Additionally, the above and other aspects, features and advantages of certain embodiments of the present disclosure will be more apparent from the following detailed description, taken in conjunction with the accompanying drawings, in which.

DETAILED DESCRIPTION

Hereinafter, various embodiments are described in detail with reference to the accompanying drawings.

Figure 1:
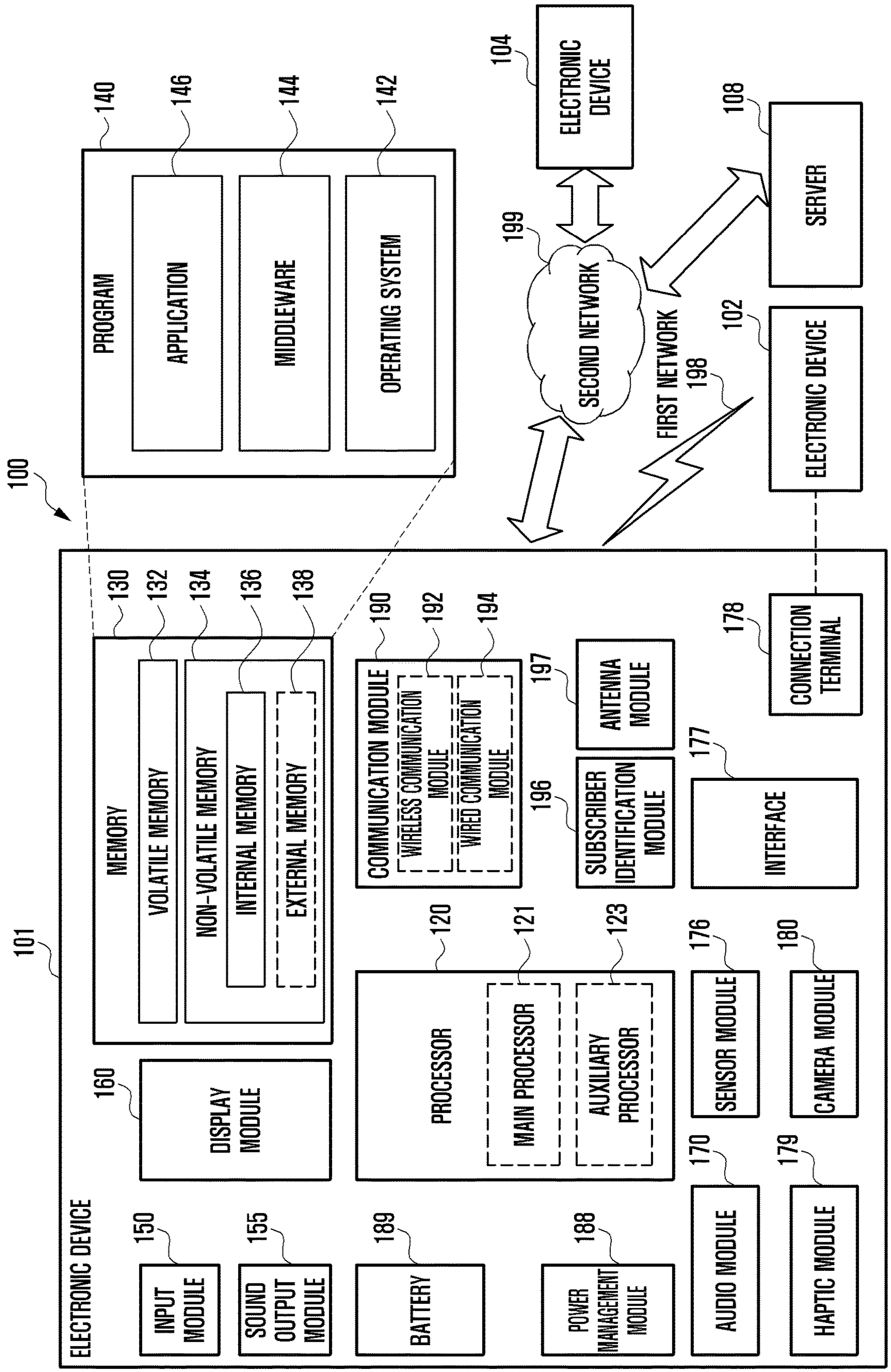
FIG. 1 is a block diagram of an electronic device in a network environment according to an embodiment.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker. The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to one embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include patch array antennas and/or dipole array antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium. According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
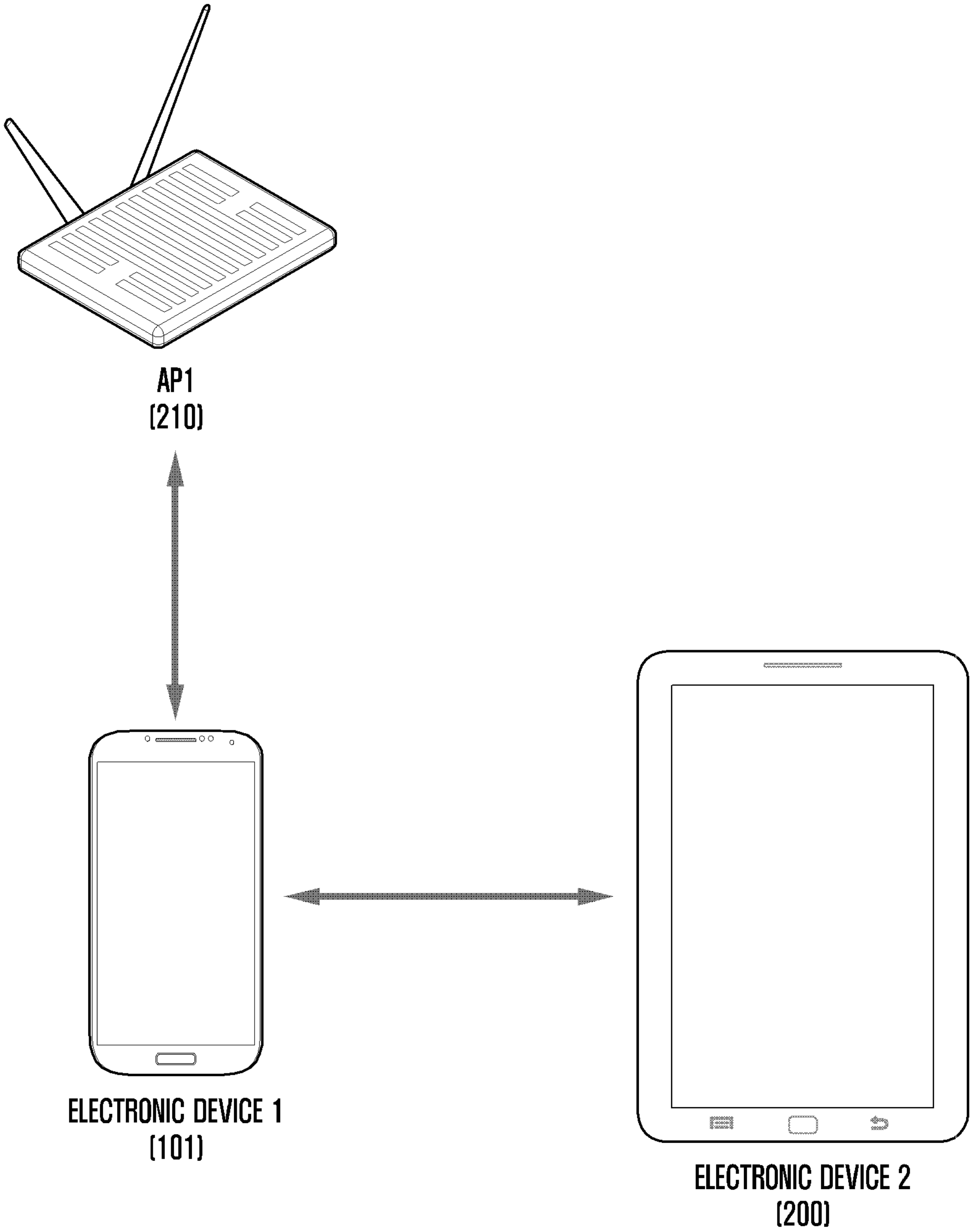
FIG. 2A is an example illustrating a wireless communication system configured to provide direct communication with electronic device 2 and wireless communication with an AP in electronic device 1 according to an embodiment.
Figure 2B:
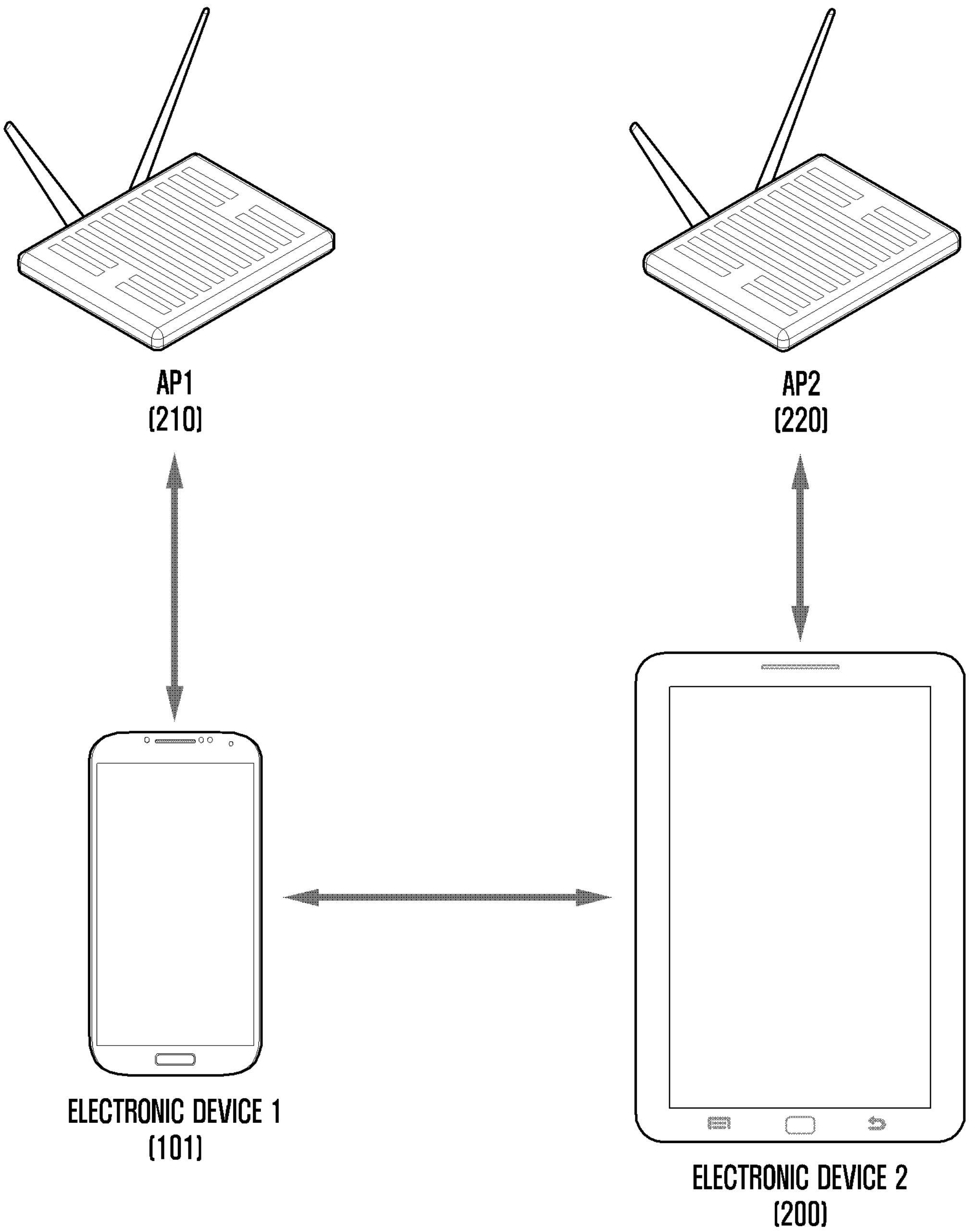
FIG. 2B is an example illustrating a wireless communication system configured to provide direct communication with electronic device 2 and wireless communication with an AP in electronic device 1 according to another embodiment.

FIG. 2A is an example illustrating a wireless communication system configured to provide direct communication with electronic device 2 and wireless communication with an AP in electronic device 1 according to an embodiment. FIG. 2B is an example illustrating a wireless communication system configured to provide direct communication with electronic device 2 and wireless communication with an AP in electronic device 1 according to another embodiment. For example, at least one of electronic device 1 101 or electronic device 2 200 in FIGS. 2A and 2B may be at least partially similar to the electronic device 101 in FIG. 1 or may further include other embodiments of the electronic device.

According to an embodiment, at least one of electronic device 1 101 or the electronic device 2 200 may support a concurrent communication mode which concurrently provides direct communication (e.g., Wi-Fi direct) with the other electronic device (e.g., electronic device 2 200 or electronic device 1 101) and wireless communication (e.g., Wi-Fi) with an access point (AP). However, at least one of electronic device 1 101 or the electronic device 2 200 may support a concurrent communication mode based on various wireless LAN-based communication methods (e.g., Wi-Fi aware, mobile hotspot, Wi-Fi mesh) in addition to the direct communication based on a wireless LAN and wireless communication with the AP. As used herein, depending on the context, the "wireless communication" may mean wireless communication (e.g., Wi-Fi) excluding the direct communication (e.g., Wi-Fi direct) to be distinguished from the direction communication.

According to an embodiment referring to FIG. 2A, electronic device 1 101 may access AP 1 210 corresponding to network infrastructure equipment, based on a wireless LAN. For example, electronic device 1 101 may perform at least one of transmission or reception of data to or from AP 1 210 through a first channel allocated from AP 1 210.

According to an embodiment, electronic device 1 101 may perform direct communication with electronic device 2 200 based on a wireless LAN. For example, electronic device 1 101 may identify existence of electronic device 2 200 for direct communication through at least one of an out of band (OOB) method, a generic service discovery (GSD) method, or a search method (e.g., legacy discovery) associated with wireless LAB-based direct communication (e.g., Wi-Fi direct). By way of example, the OOB method may include a series of operations for performing transmission or reception of information associated with detection of an electronic device for direct communication through a communication method different from wireless LAN communication. For example, the communication method different from wireless LAN communication may include at least one of Bluetooth, Bluetooth low energy (BLE), near field communication (NFC), or quick response (QR). For example, the information associated with detection of an electronic device may include at least one of information associated with a network to which the electronic device (e.g., electronic device 1 101 or electronic device 2 200) is currently connected, identification information of the electronic device, information associated with user account information or contacts, capability of the electronic device, support information of a cross connection, or information on a network supporting a cross connection. For example, the information associated with the network may include at least one of identification information (e.g., a service set identifier (SSID) or basic service set identifier (BSSID)) of the AP to which the electronic device is currently connected or channel information. For example, the information of the network supporting a cross connection may include information associated with at least one of a wireless LAN or cellular network in which the electronic device supports a cross connection. For example, the cellular network may include at least one of a 2G network, a 3G network, a 4G network (e.g., long-term evolution (LTE)), or a 5G network (e.g., new radio (NR)).

By way of example, electronic device 1 101 may determine, when electronic device 2 200 is searched, a group owner for direct communication. For example, the group owner may be determined (or selected) as an electronic device having a relatively higher group owner variable (e.g., a group owner intent) through negotiation between electronic device 1 101 and electronic device 2 200. For example, the group owner variable may be configured that a device supporting a cross connection has a relatively higher value. By way of example, the group owner may be determined (or selected) as an electronic device supporting a cross connection between electronic device 1 101 and electronic device 2 200 without the negotiation procedure associated with the group owner. For example, the cross connection may include a series of operations in which an electronic device having been configured as the group owner among electronic devices connected to direct communication shares, with another electronic device configured as a group client (e.g., GC), a network (e.g., a cellular network or a wireless LAN network) with an external electronic device. For example, the group owner may include a main device controlling direct communication between electronic device 1 101 and electronic device 2 200 performing the direct communication.

For example, electronic device 1 101 may perform at least one of transmission or reception of data to or from electronic device 2 200 through a second channel configured by the group owner. For example, in case that electronic device 1 101 is configured as the group owner, the second channel with electronic device 2 200 may be configured based on the first channel with AP 1 210.

According to an embodiment, in case of allowing to be configured as the group owner and supporting a cross connection, electronic device 1 101 may perform an additional connection for communication of electronic device 2 200 with an external network through the AP 1 210. For example, electronic device 1 101 may perform the additional connection with electronic device 2 200 through a first communication protocol for direct communication with electronic device 2 200. Electronic device 1 101 may perform a connection for multiple pieces of direct communication with electronic device 2 200 through the first communication protocol for direct communication.

According to an embodiment, electronic device 2 200 may perform direct communication with electronic device 1 101 based on a wireless LAN. For example, electronic device 2 200 may perform at least one of transmission or reception of data to or from electronic device 1 101 through the first communication protocol for direct communication.

According to an embodiment, in case that electronic device 2 200 is configured as the group client, electronic device 2 may perform an additional connection with electronic device 1 101 for communication with an external network. For example, electronic device 2 200 may perform the additional connection with electronic device 1 101 through a second communication protocol different from the first communication protocol for direct communication.

According to an embodiment referring to FIG. 2B, electronic device 2 200 may access AP 2 220 corresponding to network infrastructure equipment, based on a wireless LAN. For example, electronic device 2 200 may perform at least one of transmission or reception of data to or from AP 2 220 through a third channel allocated from AP 2 220.

According to an embodiment, electronic device 2 200 may select an AP for communication with an external network, based on a connection for direct communication with electronic device 1 101. For instance, in case that electronic device 1 101 having been configured as the group owner supports a cross connection, electronic device 2 200 may select electronic device 1 101 as an AP for communication of electronic device 2 200 with an external network.

For example, based on a channel for wireless communication of electronic device 2 200 with AP 2 220 and a channel for direct communication with electronic device 1 101, electronic device 2 200 may select an AP for communication with an external network (e.g., a wireless LAN network or cellular network). For example, in case that the channel for wireless communication with AP 2 220 and the channel for direct communication with electronic device 1 101 are identical to each other, AP 2 220 may be selected as the AP for communication of electronic device 2 200 with the external network. For example, in case that the channel for wireless communication with AP 2 220 and the channel for direct communication with electronic device 1 101 are different from each other, electronic device 1 101 supporting a cross connection may be selected as the AP for communication of electronic device 2 200 with the external network.

For example, electronic device 2 200 may select an AP for communication of electronic device 2 200 with the external network, based on a communication quality of the case of using AP 2 220. By way of example, AP 2 220 may be selected as the AP for communication of electronic device 2 200 with the external network in case that the communication quality of the case of using AP 2 220 satisfies a designated condition. By way of example, electronic device 1 101 supporting a cross connection may be selected as the AP for communication of electronic device 2 200 with the external network in case that the communication quality of the case of using AP 2 220 does not satisfy a designated condition. For example, the state that satisfies the designated condition may include a case in which the communication quality when using AP 2 220 is higher than that when using electronic device 1 101 as an AP, or a case in which the communication quality when using AP 2 220 exceeds a designated reference quality. For example, the state that does not satisfy the designated condition may include a case in which the communication quality when using AP 2 220 is lower than that when using electronic device 1 101 as an AP, or a case in which the communication quality when using AP 2 220 is equal to or less than a designated reference quality. For instance, the communication quality may include at least one of a received signal strength indicator (RSSI), a reference signal received quality (RSRQ), reference signal received power (RSRP), a signal to interference and noise ratio (SINR), a quality of service (QOS), or a bit error rate (BER).

According to an embodiment, in case that electronic device 1 101 is selected as the AP for communication with the external network, electronic device 2 200 may perform the additional connection with electronic device 1 101 through the second communication protocol different from the first communication protocol for direct communication. For example, electronic device 2 200 may perform the additional connection with electronic device 1 101 in a station mode.

According to an embodiment, electronic device 1 101 may perform the additional connection through cross connection for wireless communication between electronic device 2 200 and AP 1 210. However, the cross connection of electronic device 1 101 may support other communication methods (e.g., a cellular communication method) for wireless communication in electronic device 1 101 with the external network in addition to the wireless communication based on AP 1 210. For example, electronic device 1 101 may perform the additional connection for wireless communication between a mobile network device (e.g., an eNB or gNB) and electronic device 2 200 through cross connection.

Figure 3:
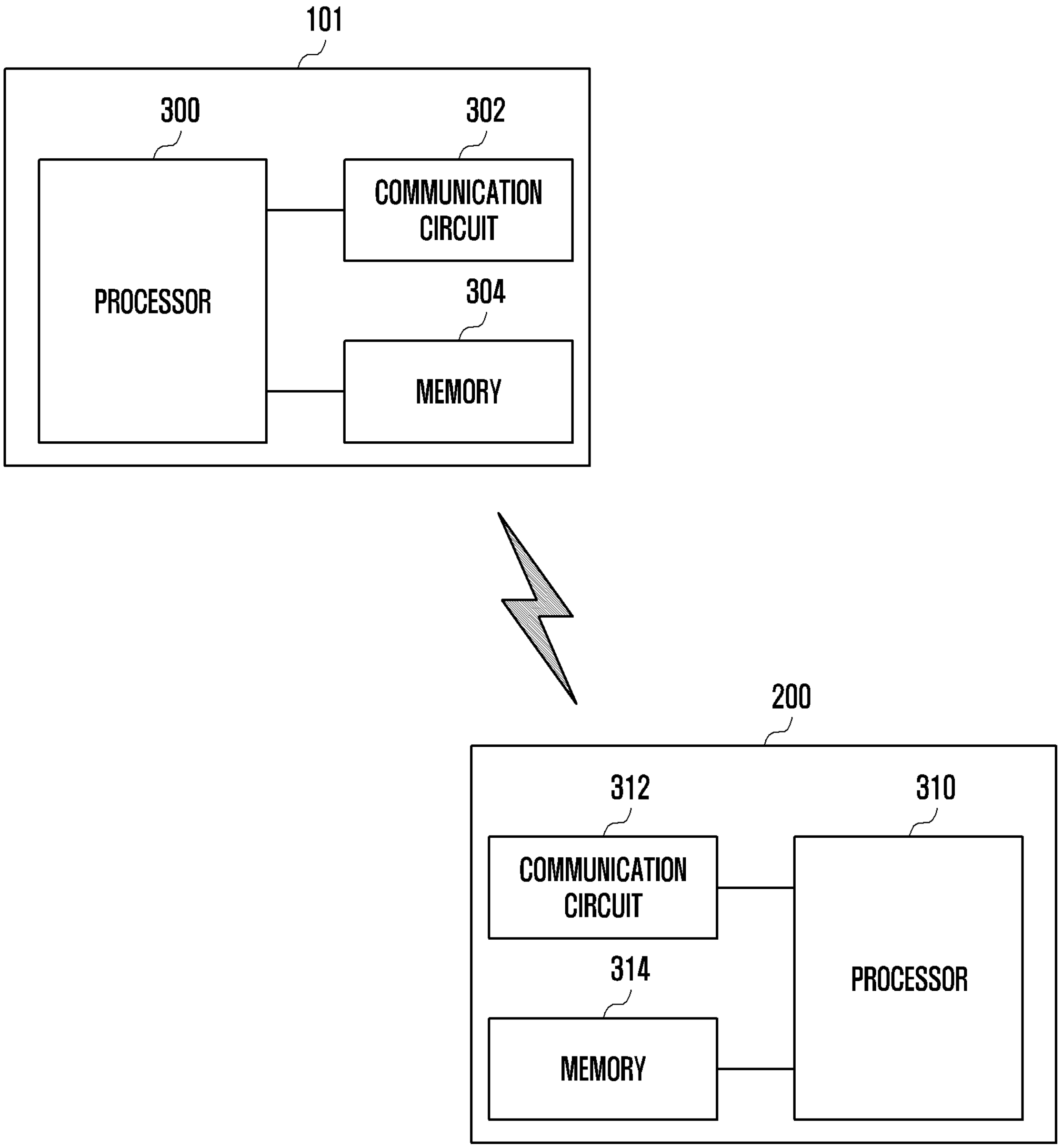
FIG. 3 is a block diagram illustrating electronic devices configured to support wireless LAN-based communication according to an embodiment.

FIG. 3 is a block diagram illustrating electronic devices configured to support wireless LAN-based communication according to an embodiment. By way of example, electronic device 1 101 in FIG. 3 may be at least partially similar to the electronic device 101 in FIG. 1 or electronic device 1 101 in FIG. 2, or may include another embodiment of an electronic device. By way of example, electronic device 2 200 in FIG. 3 may be at least partially similar to the electronic device 101 in FIG. 1 or electronic device 2 200 in FIG. 2, or may include another embodiment of an electronic device.

According to an embodiment referring to FIG. 3, electronic device 1 101 may include at least one of a processor (e.g., including processing circuitry) 300, a communication circuit (or communication circuitry) 302, or a memory 304. For example, the processor 300 may be substantially identical to the processor 120 in FIG. 1 or included in the processor 120. The communication circuit 302 may be substantially identical to the wireless communication circuit 192 in FIG. 1 or included in the wireless communication circuit 192. The memory 304 may be substantially identical to the memory 130 in FIG. 1 or included in the memory 130. By way of example, the processor 300 may include at least one of an application processor or a communication processor. For example, the processor 300 may be operatively, functionally, and/or electrically connected to at least one of the communication circuit 302 or the memory 304. The processor 300 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, the processor 300 may control the communication circuit 302 to access AP 1 210 corresponding to network infrastructure equipment, based on a wireless LAN. The processor 300 may control the communication circuit 302 to perform at least one of transmission or reception of data to or from AP 1 210 through a first channel allocated from AP 1 210.

According to an embodiment, the processor 300 may control the communication circuit 302 to perform direct communication with electronic device 2 200 based on a wireless LAN. For example, the processor 300 may control the communication circuit 302 to transmit a search request message for identifying whether electronic device 2 200 for direct communication exists. For example, the search request message may include at least one of information associated with a network to which the electronic device 1 101 is currently connected, identification information of electronic device 1 101, information associated with user account information or contacts, capability of electronic device 1 101, support information of cross connection, or information on a network supporting a cross connection. For example, the information associated with the network may include at least one of identification information (e.g., a service set identifier (SSID) or basic service set identifier (BSSID)) of AP 1 210 to which electronic device 1 101 is currently connected or channel information. For example, the information of the network supporting a cross connection may include information associated with at least one of a wireless LAN or cellular network in which the electronic device supports a cross connection. For example, the cellular network may include at least one of a 2G network, a 3G network, a 4G network (e.g., long-term evolution (LTE)), or a 5G network (e.g., new radio (NR)). For example, the search request message may be transmitted through at least one of an out of band (OOB) method, a generic service discovery (GSD) method, or a search method (e.g., legacy discovery) associated with wireless LAB-based direct communication (e.g., Wi-Fi direct). By way of example, the OOB method may include a series of operations for performing transmission or reception of information associated with detection of an electronic device for direct communication through a communication method different from wireless LAN communication. For example, the communication method different from wireless LAN communication may include at least one of Bluetooth, Bluetooth low energy (BLE), near field communication (NFC), or quick response (QR).

For example, the processor 300 may detect electronic device 2 200 for performing direct communication based on a response message related to the search request message. For example, the response message may include at least one of information associated with a network to which the electronic device 2 200 is currently connected, identification information of electronic device 2 200, information associated with user account information or contacts, capability of electronic device 2 200, support information of cross connection, or information on a network supporting a cross connection.

By way of example, in case that electronic device 2 200 for direct communication is detected, the processor 300 may determine a group owner for direct communication. For example, the group owner may be determined (or selected) as an electronic device having a relatively higher group owner variable (e.g., a group owner intent) through negotiation between electronic device 1 101 and electronic device 2 200. For example, the group owner variable may be configured that a device supporting a cross connection has a relatively higher value. By way of example, the group owner may be determined (or selected) as an electronic device supporting a cross connection between electronic device 1 101 and electronic device 2 200 without the negotiation procedure associated with the group owner. For example, the cross connection may include a series of operations in which an electronic device having been configured as the group owner among electronic devices connected to direct communication shares, with another electronic device configured as a group client (e.g., GC), a network (e.g., a cellular network or a wireless LAN network) with an external electronic device. For example, the group owner may include a main device controlling direct communication between electronic device 1 101 and electronic device 2 200 performing the direct communication.

For example, the processor 300 may control the communication circuit 302 to perform at least one of transmission or reception of data to or from electronic device 2 200 through a second channel configured by the group owner among electronic device 1 101 and electronic device 2 200. For example, the second channel may be configured based on the first channel with AP 1 210 in case that electronic device 1 101 is configured as the group owner. By way of example, the second channel may include a channel identical to the first channel with AP 1 210 in case that electronic device 1 101 is configured as the group owner.

According to an embodiment, in case that electronic device 1 101 is configured as the group owner and supports a cross connection, the processor 300 may control the communication circuit 302 to perform an additional connection for communication of electronic device 2 200 with an external network through the AP 1 210. For example, in case that direct communication with electronic device 2 200 is connected based on a wireless LAN, electronic device 1 101 is configured as the group owner, or it is identified that electronic device 2 200 supports a cross connection, the processor 300 may activate a cross connection function. The processor 300 may control the communication circuit 302 to perform an additional connection for communication of electronic device 2 200 with an external network through the AP 1 210, based on the activated cross connection function. For example, the processor 300 may control the communication circuit 302 to perform the additional connection with electronic device 2 200 through the first communication protocol for direct communication with electronic device 2 200. By way of example, the communication circuit 302 may perform a connection for multiple pieces of direct communication with electronic device 2 200 through the first communication protocol for direct communication. For example, a channel of the additional connection may include a channel identical to a first channel with AP 1 210. For example, the channel of the additional connection may include a channel (e.g., a channel in an about 5 GHz band or about 6 GHz band) different from the first channel (e.g., a channel in an about 2.4 GHz band) with AP 1 210 in case that electronic device 1 101 supports a real simultaneous dual band (RSDB) or a dual band simultaneous (DBS).

According to an embodiment, in case that electronic device 1 101 is configured as the group owner and supports a cross connection, and electronic device 2 200 is included in a cross connection activation group, the processor 300 may control the communication circuit 302 to perform the additional connection for communication of electronic device 2 200 with an external network through the AP 1 210. By way of example, the "cross connection activation group" may correspond to a list of electronic devices that are allowed to cross-connect with electronic device 1 101 and may include at least one electronic device that is determined to have an account identical to electronic device 1 101, and a family relationship or a friendship relationship with a user of electronic device 1 101.

According to an embodiment, in case that the channel with an AP (e.g., AP 1 210) for wireless communication of electronic device 1 101 is changed, the processor 300 may control the communication circuit 302 to change at least one of the channel of the additional connection or a channel for direct communication with electronic device 2 200, based on the changed channel with the AP. For example, the change of at least one of the channel for direct communication or the channel for the additional connection may be performed through a message exchange with electronic device 2 200 based on an extended channel switch announcement (ECSA).

According to an embodiment, in case that the connection for direct communication with electronic device 2 200 is released, the processor 300 may control the communication circuit 302 to release the additional connection with electronic device 2 200. For example, the processor 300 may control the communication circuit 302 to transmit, to electronic device 2 200, a request message associated with release of the additional connection based on the release of the connection for direct communication with electronic device 2 200. The processor 300 may control the communication circuit 302 to transmit the request message associated with release of the additional connection for change of an AP of electronic device 2 200 and then maintain the additional connection with electronic device 2 200 for a designated time period. The processor 300 may control the communication circuit 302 to release the additional connection with electronic device 2 200 when the designated time period has elapsed.

According to an embodiment, the communication circuit 302 may support wireless LAN communication of electronic device 1 101 with an external device (e.g., the electronic device 104, or the server 108 in FIG. 1, or AP 1 210 or electronic device 2 200 in FIG. 2A). For example, the communication circuit 302 may support multiple communication protocols. For example, the communication circuit 302 may support wireless LAN-based direct communication with electronic device 2 200 based on the first communication protocol. For example, the communication circuit 302 may support wireless LAN-based wireless communication with an external network (e.g., AP 1 210) based on the second communication protocol. For example, the communication circuit 302 may include multiple communication circuits supporting different communication protocols. For example, a first communication circuit included in the communication circuit 302 may support wireless LAN-based direct communication with electronic device 2 200 based on the first communication protocol. For example, a second communication circuit included in the communication circuit 302 may support wireless LAN-based wireless communication with an external network (e.g., AP 1 210) based on the second communication protocol. For example, the first communication circuit and the second communication circuit may include different circuits or different hardware.

According to an embodiment, the memory 304 may store various data used by at least one component (e.g., the processor 300 or the communication circuit 302) of electronic device 1 101. For example, the memory 304 may store various instructions executable through the processor 300.

According to an embodiment, electronic device 2 200 may include at least one of a processor (e.g., including processing circuitry) 310, a communication circuit (or communication circuitry) 312, or a memory 314. For example, the processor 310 may be substantially identical to the processor 120 in FIG. 1 or included in the processor 120. The communication circuit 312 may be substantially identical to the wireless communication circuit 192 in FIG. 1 or included in the wireless communication circuit 192. The memory 314 may be substantially identical to the memory 130 in FIG. 1 or included in the memory 130. By way of example, the processor 310 may include at least one of an application processor or a communication processor. For example, the processor 310 may be operatively, functionally, and/or electrically connected to at least one of the communication circuit 312 or the memory 314. The processor 310 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, the processor 310 may control the communication circuit 312 to perform direct communication with electronic device 1 101 based on a wireless LAN. For example, the processor 310 may control the communication circuit 312 to transmit a response message associated with a search request message received through at least one of an OOB method, a GSD method, or a search method (e.g., legacy discovery) associated with wireless LAB-based direct communication (e.g., Wi-Fi direct). For example, the response message may be transmitted through at least one of an OOB method, a GSD method, or a search method (e.g., legacy discovery) associated with wireless LAB-based direct communication (e.g., Wi-Fi direct).

By way of example, in case that electronic device 1 101 for direct communication is detected, the processor 310 may determine a group owner for direct communication. For example, the group owner may be determined (or selected) as an electronic device having a relatively higher group owner variable (e.g., a group owner intent) through negotiation between electronic device 1 101 and electronic device 2 200. For example, the group owner variable may be configured that a device supporting a cross connection has a relatively higher value. By way of example, the group owner may be determined (or selected) as an electronic device supporting a cross connection between electronic device 1 101 and electronic device 2 200 without the negotiation procedure associated with the group owner.

For example, the processor 310 may control the communication circuit 312 to perform at least one of transmission or reception of data to or from electronic device 2 200 through a second channel configured by the group owner among electronic device 1 101 and electronic device 1 101.

According to an embodiment, in case that electronic device 2 200 is configured as the group client, the processor 310 may control the communication circuit 312 to perform an additional connection with electronic device 1 101 for communication with an external network. For example, the processor 310 may select an AP for communication with an external network, based on a connection for direct communication between electronic device 2 200 and electronic device 1 101. For instance, the processor 310 may select, in case that electronic device 1 101 having been configured as the group owner supports a cross connection, electronic device 1 101 as an AP for communication of electronic device 2 200 with an external network.

For example, based on a channel for wireless communication with AP 2 220 which electronic device 2 200 accesses and a channel for direct communication with electronic device 1 101, the processor 310 may select an AP for communication of electronic device 2 200 with an external network. For example, in case that the channel for wireless communication with AP 2 220 and the channel for direct communication with electronic device 1 101 are identical to each other, AP 2 220 may be selected as the AP for communication of electronic device 2 200 with the external network. For example, in case that the channel for wireless communication with AP 2 220 and the channel for direct communication with electronic device 1 101 are different from each other, electronic device 1 101 supporting a cross connection may be selected as the AP for communication of electronic device 2 200 with the external network.

For example, the processor 310 may select an AP for communication of electronic device 2 200 with the external network, based on a communication quality of the case of using AP 2 220 which electronic device 2 200 accesses. By way of example, AP 2 220 may be selected as the AP for communication of electronic device 2 200 with the external network in case that the communication quality of the case of using AP 2 220 satisfies a designated condition. By way of example, electronic device 1 101 supporting a cross connection may be selected as the AP for communication of electronic device 2 200 with the external network in case that the communication quality of the case of using AP 2 220 does not satisfy a designated condition. For example, the state that satisfies the designated condition may include a case in which the communication quality when using AP 2 220 is higher than that when using electronic device 1 101 as an AP, or a case in which the communication quality when using AP 2 220 exceeds a designated reference quality. For example, the state that does not satisfy the designated condition may include a case in which the communication quality when using AP 2 220 is lower than that when selecting electronic device 1 101 as an AP, or a case in which the communication quality when using AP 2 220 is equal to or less than a designated reference quality. For instance, the communication quality may include at least one of a received signal strength indicator (RSSI), a reference signal received quality (RSRQ), reference signal received power (RSRP), a signal to interference and noise ratio (SINR), a quality of service (QOS), or a bit error rate (BER).

For example, in case that electronic device 1 101 is selected as the AP for communication of electronic device 2 200 with the external network, the processor 310 may control the communication circuit 312 to perform the additional connection with electronic device 1 101. For example, the additional connection with electronic device 1 101 may be performed based on the second communication protocol different from the first communication protocol for direct communication. For example, electronic device 2 200 may be additionally connected to electronic device 1 101 in a station mode.

According to an embodiment, the processor 310 may control the communication circuit 312 to change at least one of the channel for direct communication with electronic device 1 101 or the channel of the additional connection. For example, the processor 310 may control the communication circuit 312 to change at least one of the channel for direct communication with electronic device 1 101 or the channel of the additional connection, based on a request message associated with channel change, which is received from electronic device 1 101. By way of example, the request message associated with channel change may be exchanged with electronic device 1 101 through extended channel switch announcement (ECSA).

According to an embodiment, the processor 310 may control the communication circuit 312 to release the additional connection with electronic device 1 101 based on release of the connection for direct communication with electronic device 1 101. For example, in case that a request message associated with the release of the additional connection is received from electronic device 1 101, the processor 310 may control the communication circuit 312 to search for an AP for electronic device 2 200 to access. In case that the AP for electronic device 2 200 to access is searched, the processor 310 may control the communication circuit 312 to release the additional connection with electronic device 1 101 and access a new AP.

According to an embodiment, the communication circuit 312 may support wireless LAN communication of electronic device 2 200 with an external device (e.g., the electronic device 104, or the server 108 in FIG. 1, or AP 2 220 or electronic device 1 101 in FIG. 2B). For example, the communication circuit 312 may support multiple communication protocols. For example, the communication circuit 312 may support wireless LAN-based direct communication with electronic device 1 101 based on the first communication protocol. For example, the communication circuit 312 may support wireless LAN-based wireless communication with an external network (e.g., AP 2 220) based on the second communication protocol. For example, the communication circuit 312 may include multiple communication circuits for supporting different communication protocols. For example, a third communication circuit included in the communication circuit 312 may support wireless LAN-based direct communication with electronic device 1 101 based on the first communication protocol. For example, a fourth communication circuit included in the communication circuit 312 may support wireless LAN-based wireless communication with an external network (e.g., AP 2 220) based on the second communication protocol. For example, the third communication circuit and the fourth communication circuit may include different circuits or different hardware.

According to an embodiment, the memory 314 may store various data used by at least one component (e.g., the processor 310 or the communication circuit 312) of electronic device 2 200. For example, the memory 314 may store various instructions executable through the processor 310.

According to an embodiment, electronic device 1 101 may perform a connection for direct communication with multiple external electronic devices operating as group clients and an additional connection with the external electronic devices. Electronic device 1 101 may provide a network share service through the additional connection with each external electronic device.

According to an embodiment, electronic device 1 101 may share not only a wireless LAN network but also a cellular network through cross connection with electronic device 2 200.

According to an embodiment, an electronic device (e.g., the electronic device 101 in FIG. 1 or electronic device 2 200 in FIG. 2A, 2B or 3) may include a communication circuit (e.g., the wireless communication circuit 192 in FIG. 1 or the communication circuit 312 in FIG. 3) supporting wireless LAN communication, at least one processor (e.g., the processor 120 in FIG. 1 or the processor 310 in FIG. 3) including processing circuitry and operatively connected to the communication circuit, and a memory (e.g., the memory 130 in FIG. 1 or the memory 314 in FIG. 3) operatively connected to the at least one processor. The memory may store instructions which, when executed by the at least one processor individually or collectively, cause the electronic device to be configured as a group client for direct communication with the external electronic device configured as a group owner. According to an embodiment, the memory may store instructions which, when executed by the at least one processor, individually and/or collectively, cause the electronic device to, in a state in which a first connection for direct communication with the external electronic device has been established through a first communication protocol of the communication circuit and the external electronic device supports a cross connection, establish a second connection with the external electronic device for communication with an external network through a first AP (e.g., the AP 1 210 in FIG. 2A or 2B) to which the external electronic device is connected.

According to an embodiment, the instructions which, when executed by the at least one processor, individually and/or collectively, cause the electronic device to establish a second connection with the external electronic device through a second communication protocol different from a first communication protocol of the communication circuit.

According to an embodiment, the instructions which, when executed by the at least one processor, individually and/or collectively, cause the electronic device to: select the external electronic device from among the external electronic device and at least one AP to which the electronic device is connected, and establish the second connection with the external electronic device 101.

According to an embodiment, the instructions which, when executed by the at least one processor, individually and/or collectively, cause the electronic device to, in case that communication with a second AP (e.g., the AP 2 220 in FIG. 2B) is connected, identify a channel a the second AP and a channel of the connection of a first connection, in case that the channel of the connection with the second AP and the channel of the first connection are different from each other, select the external electronic device from among the second AP and the external electronic device, and establish the second connection with the external electronic device.

According to an embodiment, the instructions which, when executed by the at least one processor, individually and/or collectively, cause the electronic device to, in case that communication with the second AP is connected, identify a communication quality with the second AP, in case that the communication quality with the second AP does not satisfy a designated quality condition, select the external electronic device from among the second AP and the external electronic device, and establish the second connection with the external electronic device.

According to an embodiment, the instructions which, when executed by the at least one processor, individually and/or collectively, cause the electronic device to identify a communication quality with the external electronic device, in case that the communication quality with the external electronic device is higher than the communication quality with the second AP, select the external electronic device from among the second AP and the external electronic device, and establish the second connection with the external electronic device.

According to an embodiment, at least one of the channel of the first connection or the channel of the second connection may be changed based on change of a channel of connection between the external electronic device and the first AP.

According to an embodiment, the second connection with the external electronic device may be released based on release of the first connection with the external electronic device.

According to an embodiment, the memory may store instructions which, when executed by the at least one processor, individually and/or collectively, cause the electronic device to, in case that a second external electronic device is detected in a state of being connected to the second AP, configure a group owner for direct communication with the second external electronic device, in case that the electronic device is configured as the group owner for direct communication with the second external electronic device, establish a third connection with the second external electronic device through the first communication protocol, and establish a fourth connection with the second external electronic device for communication of the second external electronic device with an external network through the first communication protocol.

According to an embodiment, the electronic device (e.g., the electronic device 101 in FIG. 1, 2A, 2B or 3) may include a communication circuit (e.g., the wireless communication circuit 192 in FIG. 1 or the communication circuit 302 in FIG. 3) supporting a wireless LAN communication, at least one processor (e.g., the processor 120 in FIG. 1 or the processor 300 in FIG. 3) including processing circuitry and operatively connected to the communication circuit, and a memory (e.g., the memory 130 in FIG. 1 or the memory 304 in FIG. 3) operatively connected to the at least one processor. According to an embodiment, the memory stores instructions which, when executed by the at least one processor, individually and/or collectively, cause the electronic device to be configured as a group owner for direct communication with the external electronic device configured as a group client. According to an embodiment, the memory stores instructions which, when executed by the at least one processor, individually and/or collectively, cause the electronic device to, in a state in which a first connection for the direct communication with the external electronic device has been established through a first communication protocol of the communication circuit and the electronic device supports a cross connection, establish a second connection with the external electronic device for communication with an external network through a first AP (e.g., the AP 1 210 in FIG. 2A or 2B) to which the electronic device is connected.

Figure 4:
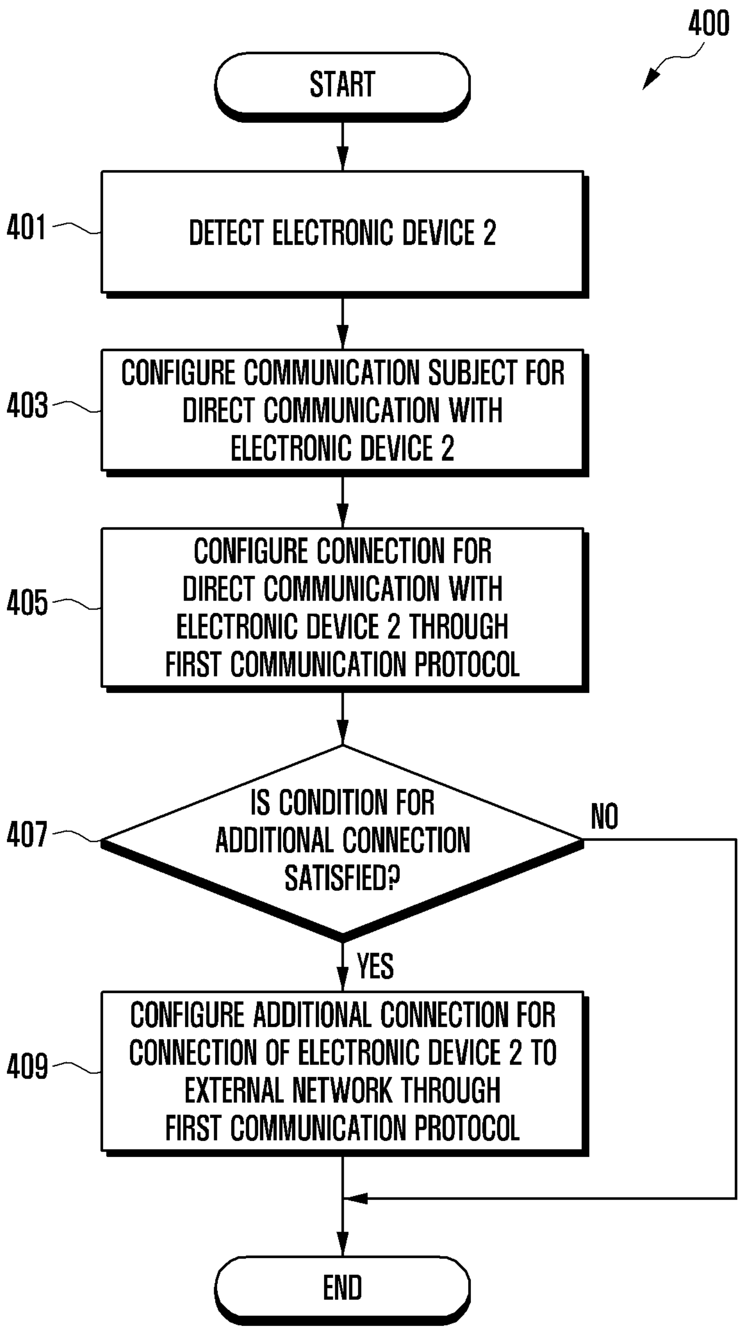
FIG. 4 is a flowchart illustrating connecting concurrent communication with electronic device 2 in electronic device 1 according to an embodiment.

FIG. 4 is a flowchart 400 illustrating connecting concurrent communication with electronic device 2 in electronic device 1 according to an embodiment. In the following embodiment, respective operations may be sequentially performed, but are not necessarily sequentially performed. For example, the sequential position of each operation may be changed, or at least two operations may be performed in parallel. By way of example, electronic device 1 in FIG. 4 may correspond to the electronic device 101 in FIG. 1 or electronic device 1 101 in FIG. 2A, 2B or 3.

According to an embodiment referring to FIG. 4, electronic device 1 (e.g., the electronic device 101 in FIG. 1 or electronic device 1 101 in FIG. 2A, 2B or 3) or a processor (e.g., the processor 120 in FIG. 1 or the processor 300 in FIG. 3) may detect electronic device 2 200 for direct communication with electronic device 1 in operation 401. For example, in case that occurrence of an event associated with direct communication is detected, the processor 300 may control the communication circuit 302 to transmit a search request message for identifying whether electronic device 2 200 for direct communication exists. The processor 300 may detect electronic device 2 200 for performing direct communication based on a response message related to the search request message. For example, the event associated with direct communication may occur based on at least one of execution of a function or application program associated with direct communication, reception of a user input (e.g., a touch input or voice input), reception of a control signal, or detection of a gesture input. For example, the search request message may be transmitted through at least one of an out of band (OOB) method, a generic service discovery (GSD) method, or a search method (e.g., legacy discovery) associated with wireless LAB-based direct communication (e.g., Wi-Fi direct). For example, the response message associated with the search request message may be received through at least one of an OOB method, a GSD method, or a search method (e.g., legacy discovery) associated with wireless LAB-based direct communication (e.g., Wi-Fi direct). For example, the search request message may include at least one of information associated with a network to which the electronic device 1 101 is currently connected, identification information of electronic device 1 101, information associated with user account information or contacts of the electronic device 1 101, capability of electronic device 1 101, support information of cross connection, or information on a network supporting a cross connection. For example, the information associated with the network may include at least one of identification information (e.g., a service set identifier (SSID) or basic service set identifier (BSSID)) of AP 1 210 to which electronic device 1 101 is currently connected or channel information. For example, the information of the network supporting a cross connection may include information associated with at least one of a wireless LAN or cellular network in which the electronic device 1 101 supports a cross connection. For example, the response message may include at least one of information associated with a network to which the electronic device 2 200 is currently connected, identification information of electronic device 2 200, information associated with user account information or contacts of the electronic device 2 200, capability of electronic device 2 200, support information of cross connection, or information on a network supporting a cross connection.

According to an embodiment, electronic device 1 (e.g., the electronic device 101 or electronic device 1 101) or the processor (e.g., the processor 120 or 300) may configure a communication subject (e.g., a group owner) for direct communication with electronic device 2 200 in operation 403. For example, the processor 300 may determine (or select) an electronic device having a relatively higher group owner variable (e.g., a group owner intent) as the group owner through negotiation with electronic device 2 200. For example, the group owner variable may be configured that a device supporting a cross connection has a relatively higher value. By way of example, the processor 300 may determine (or select) an electronic device supporting a cross connection as the group owner among electronic device 1 101 and electronic device 2 200. By way of example, the negotiation procedure of electronic device 1 101 and electronic device 2 200 for determining the group owner may be omitted based on selection of an electronic device supporting a cross connection. For example, the "cross connection" may include a series of operations in which an electronic device having been configured as the group owner among electronic devices connected to direct communication shares, with another electronic device configured as a group client (e.g., GC), a network (e.g., a cellular network or a wireless LAN network) with an external electronic device. For example, the "group owner" may include a main device controlling direct communication between electronic device 1 101 and electronic device 2 200 performing the direct communication, and the "group client" may include a device other than the main device between electronic device 1 101 and electronic device 2 200 performing the direct communication.

According to an embodiment, electronic device 1 (e.g., the electronic device 101 or electronic device 1 101) or the processor (e.g., the processor 120 or 300) may configure a connection for direct communication with electronic device 2 200 through the first communication protocol for direct communication in operation 405. For example, the processor 300 may control the communication circuit 302 to perform at least one of transmission or reception of data to or from electronic device 2 200 through a second channel configured by the group owner among electronic device 1 101 and electronic device 2 200. For example, the second channel may be configured based on the first channel with AP 1 210 in case that electronic device 1 101 is configured as the group owner. By way of example, the second channel may include a channel identical to the first channel with AP 1 210 in case that electronic device 1 101 is configured as the group owner.

According to an embodiment, electronic device 1 (e.g., the electronic device 101 or electronic device 1 101) or the processor (e.g., the processor 120 or 300) may identify whether a condition for an additional connection with electronic device 2 200 is satisfied, in operation 407. For example, in case that electronic device 1 101 is configured as the group owner and electronic device 1 101 supports a cross connection, the processor 300 may determine that the condition for an additional connection with electronic device 2 200 is satisfied. For example, in case that electronic device 1 101 is configured as the group owner, electronic device 1 101 supports a cross connection, and electronic device 2 200 is included in a cross connection activation group, the processor 300 may determine that the condition for an additional connection with electronic device 2 200 is satisfied. For example, in case that electronic device 1 101 is not configured as the group owner, electronic device 1 101 does not support a cross connection, or electronic device 2 200 is not included in the cross connection activation group, the processor 300 may determine that the condition for an additional connection with electronic device 2 200 is not satisfied. By way of example, the cross connection activation group may correspond to a list of electronic devices that are allowed to cross-connect with electronic device 1 101 and may include at least one electronic device that is determined to have an account identical to electronic device 1 101, and a family relationship or a friendship relationship with a user of electronic device 1 101. For example, the information associated with the cross connection activation group may be stored in the memory 304 or acquired from an external server.

According to an embodiment, when it is determined that the condition for an additional connection with electronic device 2 200 is not satisfied (e.g., "No" in operation 407), electronic device 1 (e.g., the electronic device 101 or electronic device 1 101) or the processor (e.g., the processor 120 or 300) may end an embodiment for connecting concurrent communication with electronic device 2 200. For example, when it is determined that the condition for the additional connection with electronic device 2 200 is not satisfied, the processor 300 may determine that the cross connection with electronic device 2 200 is limited (or impossible). In this case, the processor 300 may control the communication circuit 302 to perform direct communication with electronic device 2 200.

According to an embodiment, when it is determined that the condition for an additional connection with electronic device 2 200 is satisfied (e.g., "Yes" in operation 407), electronic device 1 (e.g., the electronic device 101 or electronic device 1 101) or the processor (e.g., the processor 120 or 300) may configure the additional connection with electronic device 2 200 for a connection of electronic device 2 200 to an external network in operation 409. For example, the processor 300 may control the communication circuit 302 to perform the additional connection with electronic device 2 200 through the first communication protocol for direct communication with electronic device 2 200. By way of example, the communication circuit 302 may perform a connection for multiple pieces of direct communication with electronic device 2 200 through the first communication protocol for direct communication. For example, a channel of the additional connection may include a channel identical to a first channel with AP 1 210. For example, the channel of the additional connection may include, in case that electronic device 1 101 supports a real simultaneous dual band (RSDB) or a dual band simultaneous (DBS), a channel (e.g., a channel in an about 5 GHz band or about 6 GHz band) different from the first channel (e.g., a channel in an about 2.4 GHz band) with AP 1 210.

According to an embodiment, electronic device 1 101 may perform sharing of an external network based on a cross connection and direct communication with electronic device 2 200.

Figure 5:
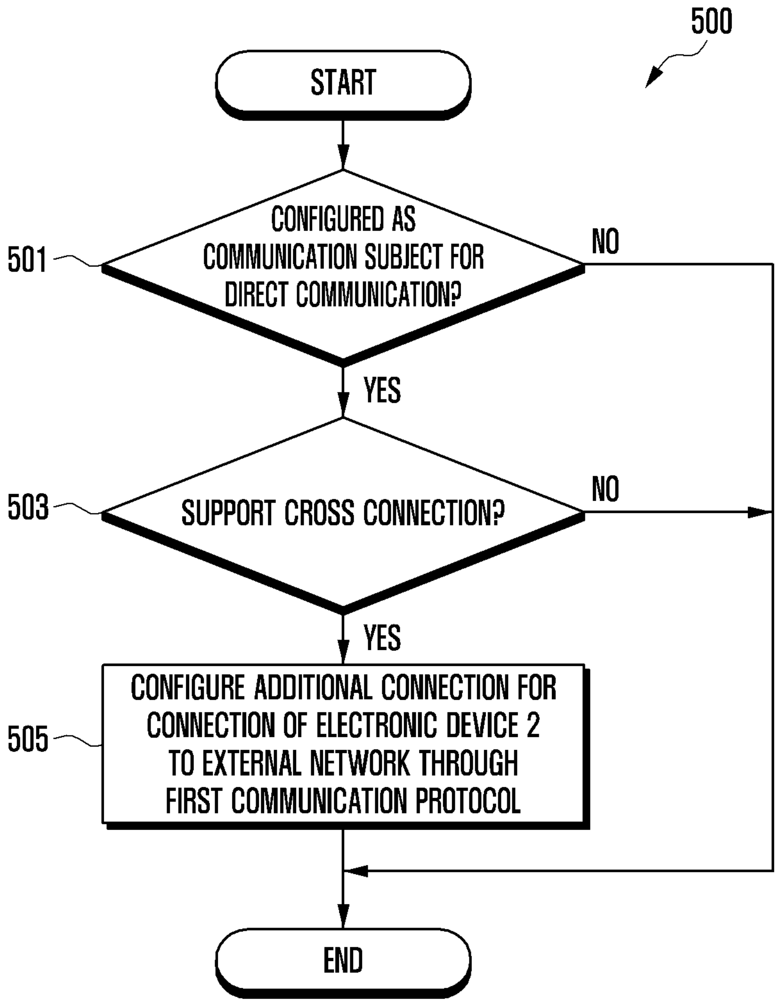
FIG. 5 is a flowchart illustrating connecting concurrent communication with electronic device 2 in electronic device 1 based on support information of a cross connection according to an embodiment.

FIG. 5 is a flowchart 500 illustrating connecting concurrent communication with electronic device 2 in electronic device 1 based on support information of a cross connection according to an embodiment. By way of example, at least a portion of FIG. 5 may include a detailed operation of operation 407 and operation 409 in FIG. 4. In the following embodiment, respective operations may be sequentially performed, but are not necessarily sequentially performed. For example, the sequential position of each operation may be changed, or at least two operations may be performed in parallel. By way of example, electronic device 1 in FIG. 5 may correspond to the electronic device 101 in FIG. 1 or electronic device 1 101 in FIG. 2A, 2B or 3.

According to an embodiment referring to FIG. 5, electronic device 1 (e.g., the electronic device 101 in FIG. 1 or electronic device 1 101 in FIG. 2A, 2B or 3) or a processor (e.g., the processor 120 in FIG. 1 or the processor 300 in FIG. 3) may identify, in case that a connection for direct communication with electronic device 2 200 is configured (e.g., operation 405 in FIG. 4), whether electronic device 1 101 is configured as a communication subject (e.g., the group owner) for direct communication with electronic device 2 200, in operation 501.

According to an embodiment, in case that electronic device 1 101 is configured as the communication object (e.g., the group owner) for direct communication with electronic device 2 200 (e.g., "Yes" in operation 501), electronic device 1 (e.g., the electronic device 101 or electronic device 1 101) or the processor (e.g., the processor 120 or 300) may identify, in operation 503, whether electronic device 1 101 supports a cross connection.

According to an embodiment, in case that electronic device 1 101 is not configured as the communication object (e.g., the group owner) for direct communication with electronic device 2 200 (e.g., "No" in operation 501) or electronic device 1 101 does not support a cross connection (e.g., "No" in operation 503), electronic device 1 (e.g., the electronic device 101 or electronic device 1 101) or the processor (e.g., the processor 120 or 300) may end an embodiment for connecting concurrent communication with electronic device 2 200. For example, the processor 300 may determine, in case that electronic device 1 101 is not configured as the communication subject (e.g., the group owner) for direct communication with electronic device 2 200 or electronic device 1 101 does not support a cross connection, that the cross connection with electronic device 2 200 is limited (or impossible).

According to an embodiment, in case that electronic device 1 101 supports a cross connection (e.g., "Yes" in operation 503), electronic device 1 (e.g., the electronic device 101 or electronic device 1 101) or the processor (e.g., the processor 120 or 300) may configure the additional connection with electronic device 2 200 for a connection of electronic device 2 200 to an external network, in operation 505. For example, the processor 300 may control, in case that electronic device 1 101 is configured as the communication subject (e.g., the group owner) for direct communication with electronic device 2 200 and electronic device 1 101 supports a cross connection, the communication circuit 302 to perform the additional connection with electronic device 2 200 through the first communication protocol for direct communication with electronic device 2 200. For example, electronic device 1 101 may substantially concurrently perform sharing of an external network based on a cross connection and direct communication with electronic device 2 200.

Figure 6:
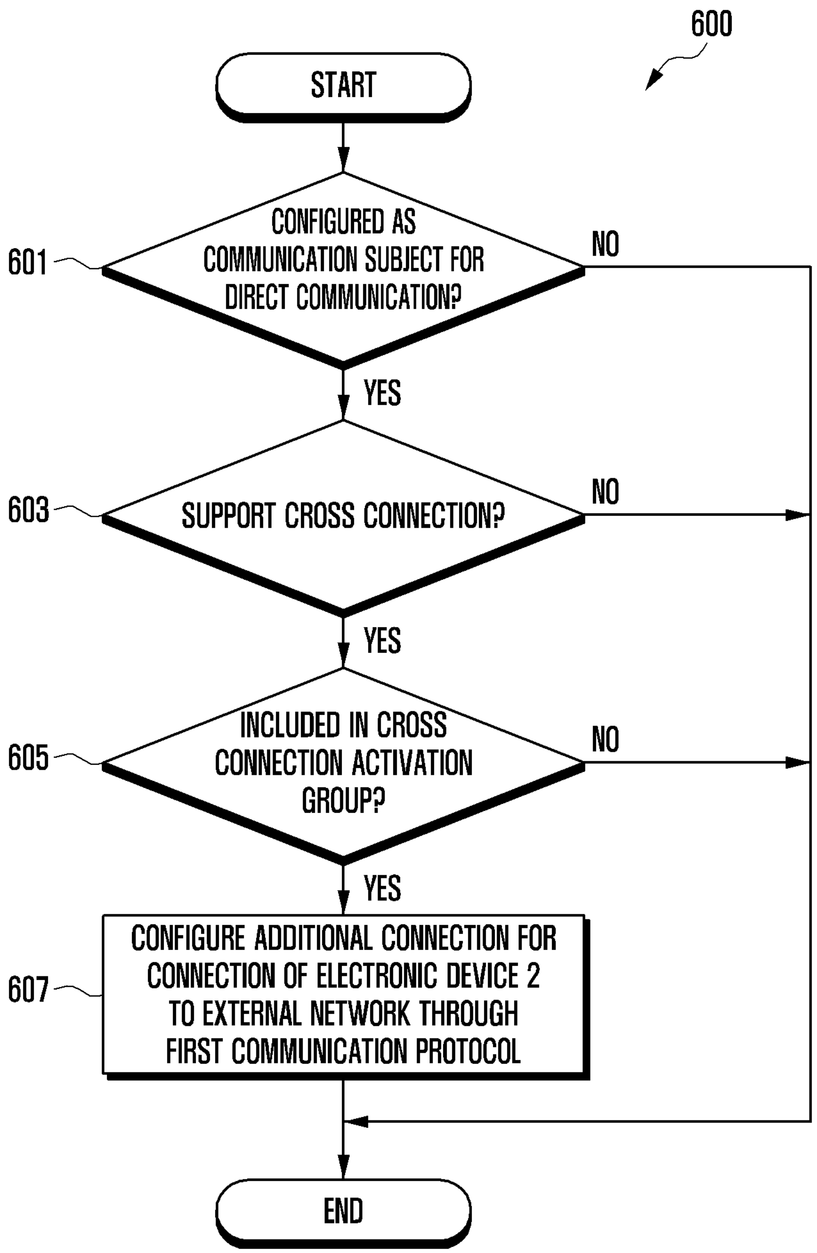
FIG. 6 is a flowchart illustrating connecting concurrent communication with electronic device 2 in electronic device 1 based on cross connection activation group information according to an embodiment.

FIG. 6 is a flowchart 600 illustrating connecting concurrent communication with electronic device 2 in electronic device 1 based on cross connection activation group information according to an embodiment. By way of example, at least a portion of FIG. 6 may include a detailed operation of operation 407 and operation 409 in FIG. 4. In the following embodiment, respective operations may be sequentially performed, but are not necessarily sequentially performed. For example, the sequential position of each operation may be changed, or at least two operations may be performed in parallel. By way of example, electronic device 1 in FIG. 6 may correspond to the electronic device 101 in FIG. 1 or electronic device 1 101 in FIG. 2A, 2B or 3.

According to an embodiment referring to FIG. 6, electronic device 1 (e.g., the electronic device 101 in FIG. 1 or electronic device 1 101 in FIG. 2A, 2B or 3) or a processor (e.g., the processor 120 in FIG. 1 or the processor 300 in FIG. 3) may identify, in case that a connection for direct communication with electronic device 2 200 is configured (e.g., operation 405 in FIG. 4), whether electronic device 1 101 is configured as a communication subject (e.g., the group owner) for direct communication with electronic device 2 200, in operation 601.

According to an embodiment, in case that electronic device 1 101 is configured as the communication object (e.g., the group owner) for direct communication with electronic device 2 200 (e.g., "Yes" in operation 601), electronic device 1 (e.g., the electronic device 101 or electronic device 1 101) or the processor (e.g., the processor 120 or 300) may identify, in operation 603, whether electronic device 1 101 supports a cross connection.

According to an embodiment, in case that electronic device 1 101 supports a cross connection (e.g., "Yes" in operation 603), electronic device 1 (e.g., the electronic device 101 or electronic device 1 101) or the processor (e.g., the processor 120 or 300) may identify, in operation 605, whether electronic device 2 200 is included in a cross connection activation group. By way of example, the cross connection activation group may correspond to a list of electronic devices that are allowed to cross-connect with electronic device 1 101 and may include at least one electronic device that is determined to have an account identical to electronic device 1 101, and a family relationship or a friendship relationship with a user of electronic device 1 101.

According to an embodiment, in case that electronic device 1 101 is not configured as the communication object (e.g., the group owner) for direct communication with electronic device 2 200 (e.g., "No" in operation 601), electronic device 1 101 does not support a cross connection (e.g., "No" in operation 603), or electronic device 2 200 is not included in the cross connection activation group (e.g., "No" in operation 605), electronic device 1 (e.g., the electronic device 101 or electronic device 1 101) or the processor (e.g., the processor 120 or 300) may end an embodiment for connecting concurrent communication with electronic device 2 200. For example, the processor 300 may determine, in case that electronic device 1 101 is not configured as the communication subject (e.g., the group owner) for direct communication with electronic device 2 200, electronic device 1 101 does not support a cross connection, or electronic device 2 200 is not included in the cross connection activation group, that the cross connection with electronic device 2 200 is limited (or impossible).

According to an embodiment, in case that electronic device 2 200 is included in the cross connection activation group (e.g., "Yes" in operation 605), electronic device 1 (e.g., the electronic device 101 or electronic device 1 101) or the processor (e.g., the processor 120 or 300) may configure the additional connection with electronic device 2 200 for a connection of electronic device 2 200 to an external network, in operation 607. For example, the processor 300 may control, in case that electronic device 1 101 is configured as the communication subject (e.g., the group owner) for direct communication with electronic device 2 200, electronic device 1 101 supports a cross connection, and electronic device 2 200 is included in the cross connection activation group, the communication circuit 302 to perform the additional connection with electronic device 2 200 through the first communication protocol for direct communication with electronic device 2 200. For example, electronic device 1 101 may substantially concurrently perform sharing of an external network based on a cross connection and direct communication with electronic device 2 200.

Figure 7:
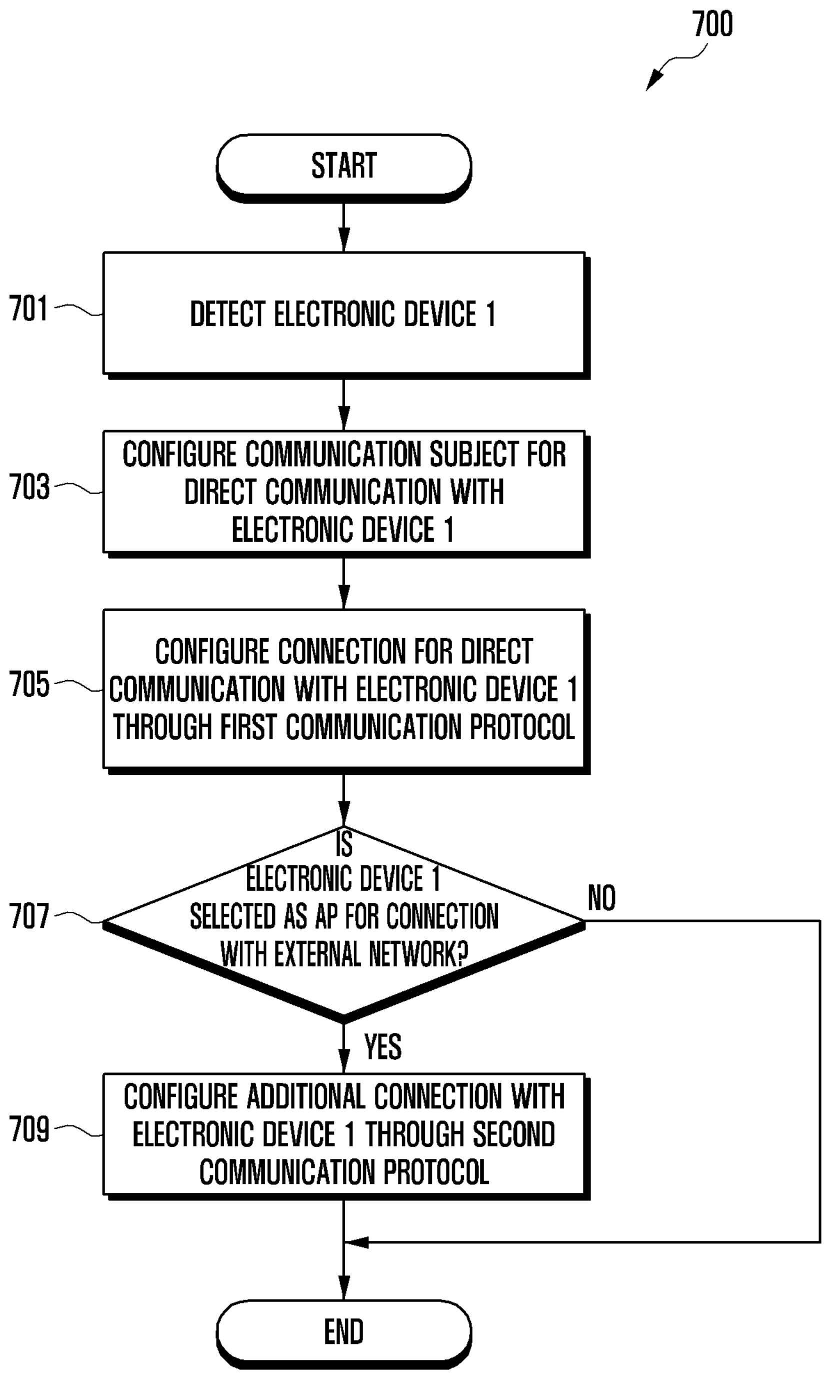
FIG. 7 is a flowchart illustrating connecting concurrent communication with electronic device 1 in electronic device 2 according to an embodiment.

FIG. 7 is a flowchart 700 illustrating connecting concurrent communication with electronic device 1 in electronic device 2 according to an embodiment. In the following embodiment, respective operations may be sequentially performed, but are not necessarily sequentially performed. For example, the sequential position of each operation may be changed, or at least two operations may be performed in parallel. By way of example, electronic device 2 in FIG. 7 may correspond to the electronic device 101 in FIG. 1 or electronic device 2 200 in FIG. 2A, 2B or 3.

According to an embodiment referring to FIG. 7, electronic device 2 (e.g., the electronic device 101 in FIG. 1 or electronic device 2 200 in FIG. 2A, 2B or 3) or a processor (e.g., the processor 120 in FIG. 1 or the processor 310 in FIG. 3) may detect electronic device 1 101 for direct communication with electronic device 2 200 in operation 701. For example, the processor 310 may determine, in case that a search request message is received from electronic device 1 101 through the communication circuit 312, electronic device 1 101 as an electronic device for direct communication. The processor 310 may control the communication circuit 302 to transmit a response message associated with the search request message. For example, the search request message may be received through at least one of an OOB method, a GSD method, or a search method (e.g., legacy discovery) associated with wireless LAB-based direct communication (e.g., Wi-Fi direct). For example, the response message associated with the search request message may be transmitted through at least one of an OOB method, a GSD method, or a search method (e.g., legacy discovery) associated with wireless LAB-based direct communication (e.g., Wi-Fi direct).

According to an embodiment, electronic device 2 (e.g., the electronic device 101 or electronic device 2 200) or the processor (e.g., the processor 120 or 310) may configure a communication subject (e.g., a group owner) for direct communication with electronic device 1 101 in operation 703. For example, the processor 310 may determine (or select) an electronic device having a relatively higher group owner variable (e.g., a group owner intent) as the group owner through negotiation with electronic device 1 101. By way of example, the processor 310 may determine (or select) an electronic device supporting a cross connection as the group owner among electronic device 1 101 and electronic device 2 200. By way of example, the negotiation procedure of electronic device 1 101 and electronic device 2 200 for determining the group owner may be omitted based on selection of an electronic device supporting a cross connection. For example, the cross connection may include a series of operations in which an electronic device having been configured as the group owner among electronic devices connected to direct communication shares, with another electronic device configured as a group client (e.g., GC), a network (e.g., a cellular network or a wireless LAN network) with an external electronic device. For example, the group owner may include a main device controlling direct communication between electronic device 1 101 and electronic device 2 200 performing the direct communication.

According to an embodiment, electronic device 2 (e.g., the electronic device 101 or electronic device 2 200) or the processor (e.g., the processor 120 or 310) may configure a connection for direct communication with electronic device 1 101 through the first communication protocol for direct communication in operation 705. For example, the processor 310 may control the communication circuit 312 to perform at least one of transmission or reception of data to or from electronic device 1 101 through a channel configured by the group owner among electronic device 1 101 and electronic device 2 200.

According to an embodiment, electronic device 2 (e.g., the electronic device 101 or electronic device 2 200) or the processor (e.g., the processor 120 or 310) may identify whether electronic device 1 101 is selected as an AP for communication of electronic device 2 200 with an external network, in operation 707. For instance, the processor 310 may select, in case that electronic device 1 101 having been configured as the group owner supports a cross connection, electronic device 1 101 as an AP for communication of electronic device 2 200 with an external network.

For example, based on a channel for wireless communication with AP 2 220 which electronic device 2 200 accesses and a channel for direct communication with electronic device 1 101, the processor 310 may select an AP for communication of electronic device 2 200 with an external network. For example, in case that the channel for wireless communication with AP 2 220 and the channel for direct communication with electronic device 1 101 are identical to each other, AP 2 220 may be selected as the AP for communication of electronic device 2 200 with the external network. For example, in case that the channel for wireless communication with AP 2 220 and the channel for direct communication with electronic device 1 101 are different from each other, electronic device 1 101 supporting a cross connection may be selected as the AP for communication of electronic device 2 200 with the external network.

For example, the processor 310 may select an AP for communication of electronic device 2 200 with the external network, based on a communication quality of the case of using AP 2 220 which electronic device 2 200 accesses. By way of example, AP 2 220 may be selected as the AP for communication of electronic device 2 200 with the external network in case that the communication quality of the case of using AP 2 220 satisfies a designated condition. By way of example, electronic device 1 101 supporting a cross connection may be selected as the AP for communication of electronic device 2 200 with the external network in case that the communication quality of the case of using AP 2 220 does not satisfy a designated condition. For example, the state that satisfies the designated condition may include a case in which the communication quality when using AP 2 220 is higher than that when using electronic device 1 101 as an AP, or a case in which the communication quality when using AP 2 220 exceeds a designated reference quality. For example, the state that does not satisfy the designated condition may include a case in which the communication quality when using AP 2 220 is lower than that when using electronic device 1 101 as an AP, or a case in which the communication quality when using AP 2 220 is equal to or less than a designated reference quality. For instance, the communication quality may include at least one of a received signal strength indicator (RSSI), a reference signal received quality (RSRQ), reference signal received power (RSRP), a signal to interference and noise ratio (SINR), a quality of service (QOS), or a bit error rate (BER).

According to an embodiment, in case that electronic device 1 101 is not selected as an AP for communication of electronic device 2 200 with an external network (e.g., "No" in operation 707), electronic device 2 (e.g., the electronic device 101 or electronic device 2 200) or the processor (e.g., the processor 120 or 310) may end an embodiment for connecting concurrent communication with electronic device 1 101. For example, in case that electronic device 1 101 is not selected as an AP for communication of electronic device 2 200 with an external network, the processor 310 may determine that the cross connection with electronic device 1 101 is limited (or impossible). The processor 310 may control the communication circuit 312 to perform direct communication with electronic device 1 101.

According to an embodiment, in case that electronic device 1 101 is selected as an AP for communication of electronic device 2 200 with an external network (e.g., "Yes" in operation 707), electronic device 2 (e.g., the electronic device 101 or electronic device 2 200) or the processor (e.g., the processor 120 or 310) may configure the additional connection with electronic device 1 101 for a connection to an external network, in operation 709. For example, the processor 310 may control the communication circuit 312 to perform the additional connection with electronic device 1 101 through the second communication protocol different from the first communication protocol for direct communication with electronic device 1 101. For example, electronic device 2 200 may be additionally connected to electronic device 1 101 in a station mode.

Figure 8:
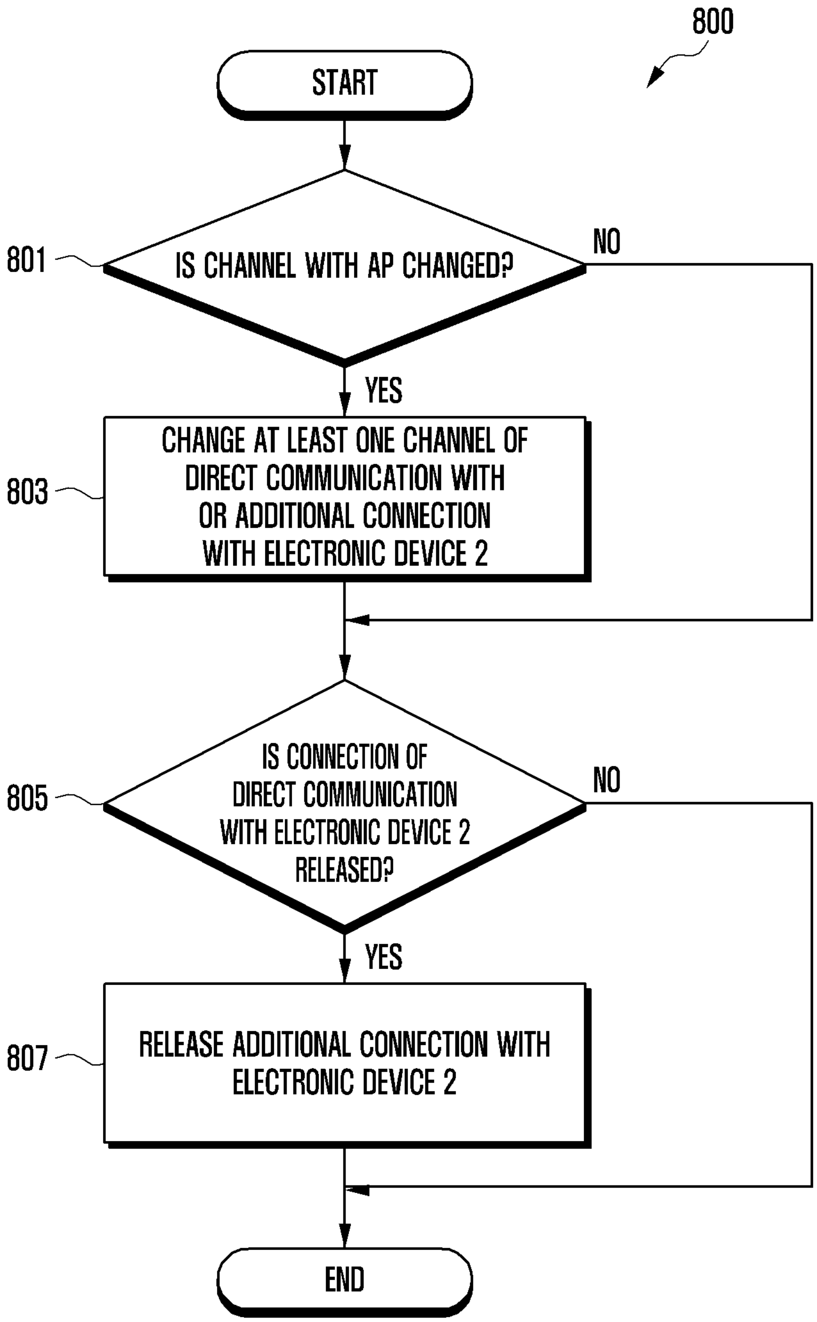
FIG. 8 is a flowchart illustrating disconnection from electronic device 2 in electronic device 1 according to an embodiment.

FIG. 8 is a flowchart 800 illustrating disconnection from electronic device 2 in electronic device 1 according to an embodiment. In the following embodiment, respective operations may be sequentially performed, but are not necessarily sequentially performed. For example, the sequential position of each operation may be changed, or at least two operations may be performed in parallel. By way of example, electronic device 1 in FIG. 8 may correspond to the electronic device 101 in FIG. 1 or electronic device 1 101 in FIG. 2A, 2B or 3.

According to an embodiment referring to FIG. 8, in case that an additional connection and a connection for direct communication with electronic device 2 200 are configured (e.g., operation 409 in FIG. 4), electronic device 1 (e.g., the electronic device 101 in FIG. 1 or electronic device 1 101 in FIG. 2A, 2B or 3) or a processor (e.g., the processor 120 in FIG. 1 or the processor 300 in FIG. 3) may identify, whether a channel with an AP (e.g., AP 1 210) is changed, in operation 801. For example, the change of the channel with the AP may include a channel for wireless communication with the AP which electronic device 1 101 accesses or a series of operations in which the AP which electronic device 1 101 accesses is changed.

According to an embodiment, electronic device 1 (e.g., the electronic device 101 or electronic device 1 101) or the processor (e.g., the processor 120 or 300) may identify, in case that the channel with the AP is not changed (e.g., "No" in operation 801), whether a connection for direct communication with electronic device 2 200 is released, in operation 805.

According to an embodiment, in case that the channel with the AP is changed (e.g., "Yes" in operation 801), electronic device 1 (e.g., the electronic device 101 or electronic device 1 101) or the processor (e.g., the processor 120 or 300) may change at least one of a channel of the connection for direct communication with electronic device 2 200 or a channel of additional connection with electronic device 2 200 based on the change of the channel with the AP in operation 803. For example, the processor 300 may control the communication circuit 302 to transmit, to electronic device 2 200, a request message associated with change of a channel based on the change of the channel with the AP. For example, in case that a designated time period has elapsed from a time point at which a request message associated with channel change has transmitted, the processor 300 may change at least one channel of the additional connection or the connection for direct communication with electronic device 2 200. For example, in case that an acceptance message corresponding to the request message associated with channel change is received, the processor 300 may change at least one channel of the additional connection or the connection for direct communication with electronic device 2 200. By way of example, at least one channel of the additional connection or the connection for direct communication with electronic device 2 200 may be changed to a channel identical to the channel with the changed AP of electronic device 1 101. By way of example, at least one of the request message associated with channel change or the acceptance message may be exchanged with electronic device 2 200 through extended channel switch announcement (ECSA).

According to an embodiment, electronic device 1 (e.g., the electronic device 101 or electronic device 1 101) or the processor (e.g., the processor 120 or 300) may identify whether the connection for direct communication with electronic device 2 200 is released, in operation 805. For example, in case that an event associated with the release of direct communication is detected, the processor 300 may determine that a connection for direct communication with electronic device 2 200 is released. The processor 300 may control the communication circuit 302 to release the connection for direct communication with electronic device 2 200. For example, the event associated with the release of direct communication may occur based on the end of execution of a function or an application program associated with direct communication.

According to an embodiment, in case that the connection for direct communication with electronic device 2 200 is not released (e.g., "No" in operation 805), electronic device 1 (e.g., the electronic device 101 or electronic device 1 101) or the processor (e.g., the processor 120 or 300) may end an embodiment for releasing of the connection with electronic device 2 200.

According to an embodiment, in case that the connection for direct communication with electronic device 2 200 is released (e.g., "Yes" in operation 805), electronic device 1 (e.g., the electronic device 101 or electronic device 1 101) or the processor (e.g., the processor 120 or 300) may release the additional connection with electronic device 2 200, in operation 807. For example, the processor 300 may control the communication circuit 302 to transmit, to electronic device 2 200, a request message associated with release of the additional connection based on the release of the connection for direct communication with electronic device 2 200. The processor 300 may control the communication circuit 302 to transmit the request message associated with release of the additional connection for change of an AP of electronic device 2 200 and then maintain the additional connection with electronic device 2 200 for a designated time period. The processor 300 may control the communication circuit 302 to release the additional connection with electronic device 2 200 when the designated time period has elapsed.

According to an embodiment, in case that the connection for direct communication with electronic device 2 200 is released, electronic device 1 101 may maintain the additional connection with electronic device 2 200. For example, in case that there is no AP which electronic device 2 200 may access, electronic device 1 101 may maintain the additional connection with electronic device 2 200. For example, in case that the quality of service (e.g., QoS) of the additional connection with electronic device 2 200 is determined to be better than the quality of service with the AP which electronic device 2 (200) may access, the electronic device 1 101 may maintain the additional connection with electronic device 2 200.

Figure 9:
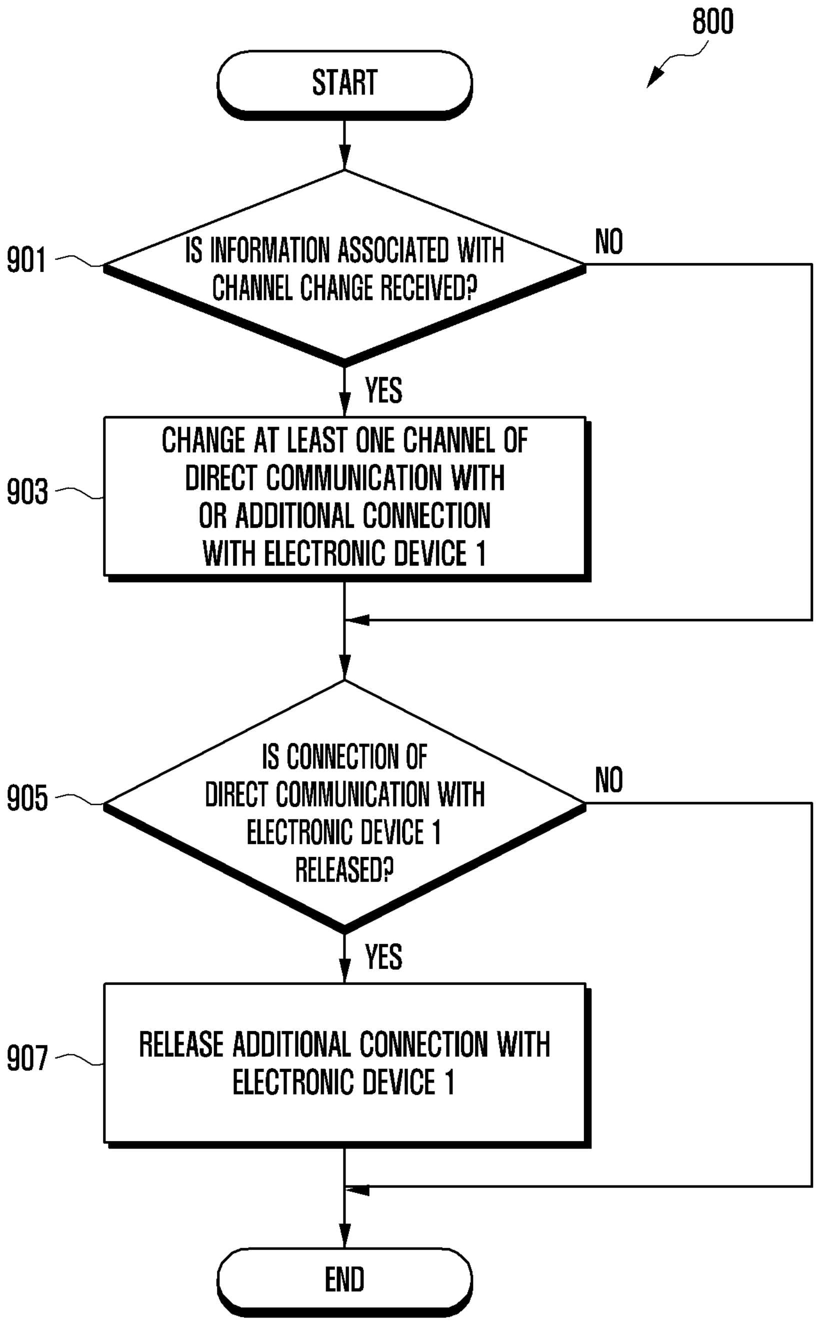
FIG. 9 is a flowchart illustrating disconnection from electronic device 1 in electronic device 2 according to an embodiment.

FIG. 9 is a flowchart 900 illustrating disconnection from electronic device 1 in electronic device 2 according to an embodiment. In the following embodiment, respective operations may be sequentially performed, but are not necessarily sequentially performed. For example, the sequential position of each operation may be changed, or at least two operations may be performed in parallel. By way of example, electronic device 2 in FIG. 9 may correspond to the electronic device 101 in FIG. 1 or electronic device 2 200 in FIG. 2A, 2B or 3.

According to an embodiment referring to FIG. 9, in case that an additional connection and a connection for direct communication with electronic device 1 101 are configured (e.g., operation 709 in FIG. 7), electronic device 2 (e.g., the electronic device 101 in FIG. 1 or electronic device 2 200 in FIG. 2A, 2B or 3) or a processor (e.g., the processor 120 in FIG. 1 or the processor 310 in FIG. 3) may identify whether information associated with the channel change is received from electronic device 1 101, in operation 901. For example, the information associated with the channel change may be received through direct communication with electronic device 1 101 or an OOB method.

According to an embodiment, in case that the information associated with the channel change is not received (e.g., "No" in operation 901), electronic device 2 (e.g., the electronic device 101 or electronic device 2 200) or the processor (e.g., the processor 120 or 310) may identify whether a connection for direct communication with electronic device 1 101 is released, in operation 905.

According to an embodiment, in case that the information associated with the channel change is received (e.g., "Yes" in operation 901), electronic device 2 (e.g., the electronic device 101 or electronic device 2 200) or the processor (e.g., the processor 120 or 310) may change at least one of a channel of the connection for direct communication with electronic device 1 101 or a channel of additional connection with electronic device 1 101 based on the information associated with the channel change, in operation 903. For example, the processor 310 may control the communication circuit 312 to change at least one channel of the additional connection or the connection for direct communication with electronic device 1 101 based on the information associated with channel change included in the request message associated with the channel change. By way of example, the request message associated with channel change may be received from electronic device 1 101 through extended channel switch announcement (ECSA).

According to an embodiment, electronic device 2 (e.g., the electronic device 101 or electronic device 2 200) or the processor (e.g., the processor 120 or 310) may identify whether the connection for direct communication with electronic device 1 101 is released, in operation 905. For example, in case that a message associated with connection release of direct communication with electronic device 1 101 is received, the processor 310 may determine that a connection for direct communication with electronic device 1 101 is released. The processor 310 may control the communication circuit 312 to release the connection for direct communication with electronic device 1 101. For example, the message associated with connection release of direct communication may be received through direct communication with electronic device 1 101 or an OOB method.

According to an embodiment, in case that the connection for direct communication with electronic device 1 101 is not released (e.g., "No" in operation 905), electronic device 2 (e.g., the electronic device 101 or electronic device 2 200) or the processor (e.g., the processor 120 or 310) may end an embodiment for releasing of the connection with electronic device 1 101.

According to an embodiment, in case that the connection for direct communication with electronic device 1 101 is released (e.g., "Yes" in operation 905), electronic device 2 (e.g., the electronic device 101 or electronic device 2 200) or the processor (e.g., the processor 120 or 310) may release the additional connection with electronic device 1 101, in operation 907. For example, the processor 310 may control, in case that a request message associated with the release of the additional connection is received from electronic device 1 101, the communication circuit 312 to search for an AP for electronic device 2 200 to access. In case that the AP for electronic device 2 200 to access is searched, the processor 310 may control the communication circuit 312 to release the additional connection with electronic device 1 101 and access a new AP. For example, the request message associated with release of the additional connection may be received through the additional connection with electronic device 1 101 or an OOB method.

Figure 10:
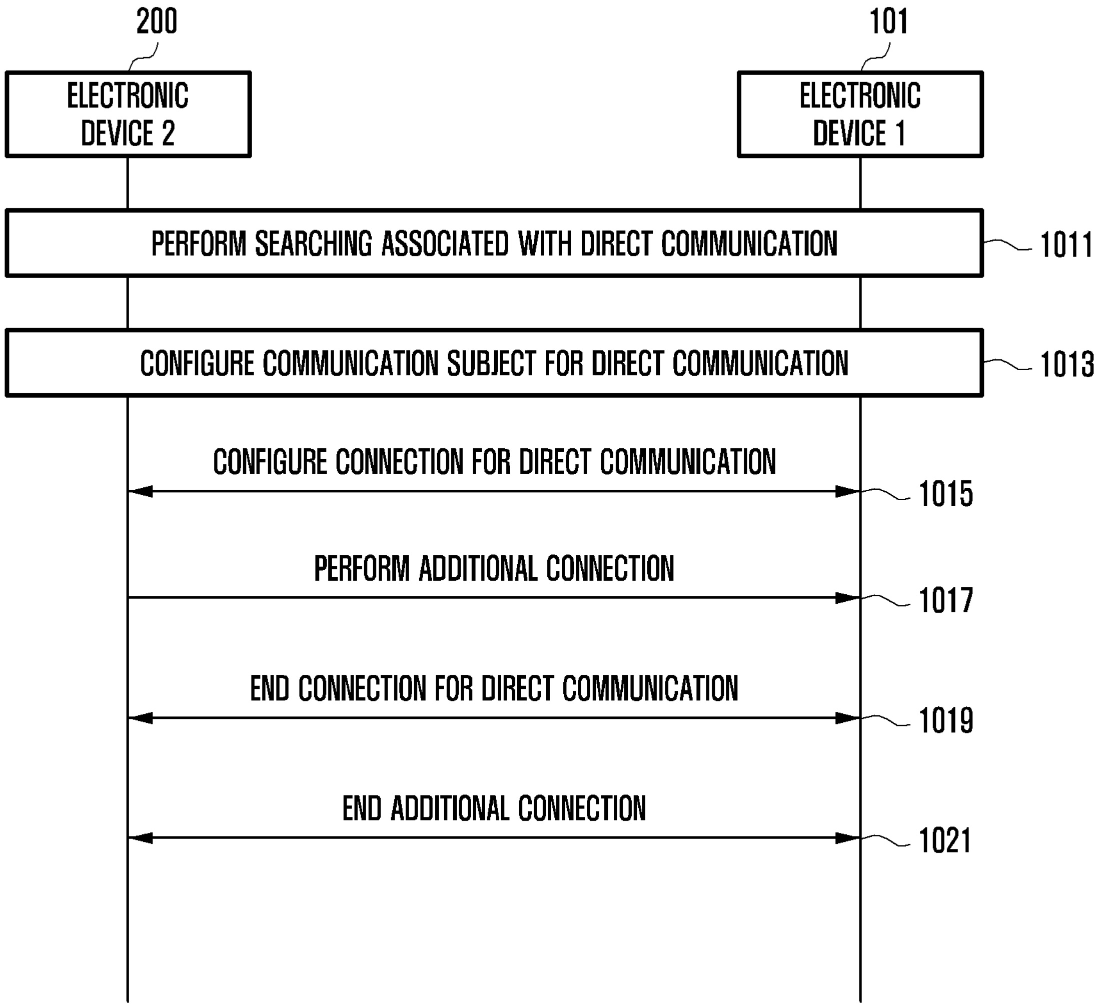
FIG. 10 is an example illustrating connecting concurrent communication with electronic device 2 in electronic device 1 according to an embodiment.

FIG. 10 is an example illustrating connecting concurrent communication with electronic device 2 in electronic device 1 according to an embodiment.

According to an embodiment referring to FIG. 10, electronic device 1 101 may perform searching associated with direct communication (e.g., operation 1011). For example, in case that occurrence of an event associated with direct communication is detected, electronic device 1 101 may perform searching associated with direct communication. By way of example, the searching associated with direct communication may include a series of operations of identifying whether there is another electronic device (e.g., electronic device 2 200) for performing direct communication with electronic device 1 101. For example, the event associated with direct communication may occur based on at least one of execution of a function or application program associated with direct communication, reception of a user input (e.g., a touch input or voice input), reception of a control signal, or detection of a gesture input. For example, the searching associated with direct communication may include a series of operations of exchanging the search request message through at least one of an out of band (OOB) method, a generic service discovery (GSD) method, or a search method (e.g., legacy discovery) associated with wireless LAB-based direct communication (e.g., Wi-Fi direct). For example, the search request message may include at least one of information associated with a network to which the electronic device 1 101 is currently connected, identification information of electronic device 1 101, information associated with user account information or contacts, capability of electronic device 1 101, support information of cross connection, or information on a network supporting a cross connection. For example, the information associated with the network may include at least one of identification information (e.g., a service set identifier (SSID) or basic service set identifier (BSSID)) of AP 1 210 to which electronic device 1 101 is currently connected or channel information. For example, the information of the network supporting a cross connection may include information associated with at least one of a wireless LAN or cellular network in which the electronic device supports a cross connection.

According to an embodiment, in case that electronic device 2 200 is detected through the searching for direct communication, electronic device 1 101 may configure a communication subject (e.g., the group owner) for direct communication with electronic device 2 200 (e.g., operation 1013). For example, electronic device 1 101 and electronic device 2 200 may determine (or select) an electronic device having a relatively higher group owner variable (e.g., a group owner intent) as the group owner through negotiation associated with the group owner. For example, the group owner variable may be configured that a device supporting a cross connection has a relatively higher value. By way of example, electronic device 1 101 and electronic device 2 200 may determine (or select) an electronic device supporting a cross connection as the group owner among electronic device 1 101 and electronic device 2 200 without negotiation associated with the group owner. For example, the cross connection may include a series of operations in which an electronic device having been configured as the group owner among electronic devices connected to direct communication shares, with another electronic device configured as a group client (e.g., GC), a network (e.g., a cellular network or a wireless LAN network) with an external electronic device. For example, the group owner may include a main device controlling direct communication between electronic device 1 101 and electronic device 2 200 performing the direct communication.

According to an embodiment, electronic device 1 101 and electronic device 2 200 may configure a connection for direct communication (e.g., operation 1015). For example, in case that electronic device 1 101 is configured as the group owner, a second channel for direct communication with electronic device 2 200 may be configured based on a first channel with AP 1 210 which electronic device 1 101 accesses. Electronic device 1 101 may perform at least one of transmission or reception of data to or from electronic device 2 200 through the second channel. By way of example, the second channel may include a channel identical to the first channel with AP 1 210 in case that electronic device 1 101 is configured as the group owner.

According to an embodiment, electronic device 1 101 and electronic device 2 200 may perform an additional connection for wireless communication of electronic device 2 200 to an external network (e.g., operation 1017). For example, electronic device 1 101 and electronic device 2 200 may determine that electronic device 1 101 satisfies a condition for the additional connection with electronic device 2 200, and in case that electronic device 2 200 selects electronic device 1 101 as an AP for wireless communication with an external network, perform the additional connection. For example, electronic device 1 101 may perform the additional connection with electronic device 2 200 through a first communication protocol for direct communication. For example, electronic device 2 200 may perform the additional connection with electronic device 1 101 through a second communication protocol different from the first communication protocol for direct communication. By way of example, the state in which the condition for the additional connection with electronic device 2 200 is satisfied may include a state in which electronic device 1 101 is configured as the group owner and a state in which electronic device 1 101 supports a cross connection. By way of example, the state in which the condition for the additional connection with electronic device 2 200 is satisfied may include a state in which electronic device 1 101 is configured as the group owner, a state in which electronic device 1 101 supports a cross connection, and a state in which electronic device 2 200 is included in a cross connection activation group. By way of example, the cross connection activation group may correspond to a list of electronic devices that are allowed to cross-connect with electronic device 1 101 and may include at least one electronic device that is determined to have an account identical to electronic device 1 101, and a family relationship or a friendship relationship with a user of electronic device 1 101. By way of example, the selection of the AP for wireless communication with the external network may include a series of operations in which electronic device 1 101 configured as the group owner and supporting a cross connection is selected. For example, in case that the channel for wireless communication with AP 2 220 which electronic device 2 200 accesses and the channel for direct communication with electronic device 1 101 are different from each other, the selection of the AP for wireless communication with the external network may include a series of operations in which electronic device 1 101 supporting a cross connection is selected. For example, in case that the communication quality of the case of using AP 2 220 which electronic device 2 200 accesses does not satisfy a designated condition, the selection of the AP for wireless communication with the external network may include a series of operations in which electronic device 1 101 supporting a cross connection is selected. For example, the state that does not satisfy the designated condition may include a case in which the communication quality when using AP 2 220 is lower than that when selecting electronic device 1 101 as an AP, or a case in which the communication quality when using AP 2 220 is equal to or less than a designated reference quality. For instance, the communication quality may include at least one of a received signal strength indicator (RSSI), a reference signal received quality (RSRQ), reference signal received power (RSRP), a signal to interference and noise ratio (SINR), a quality of service (QOS), or a bit error rate (BER).

According to an embodiment, electronic device 1 101 and electronic device 2 200 may release the connection for direct communication (e.g., operation 1019). For example, in case that occurrence of an event associated with the release of direct communication is detected, electronic device 1 101 may transmit a request message associated with connection release of direct communication to electronic device 2 200. Electronic device 1 101 may release the connection for direct communication with electronic device 2 200 based on the transmission of the request message associated with the release of direct communication. Electronic device 2 200 may release the connection for direct communication with electronic device 1 101 based on reception of the request message associated with the release of direct communication.

According to an embodiment, electronic device 1 101 and electronic device 2 200 may release the additional connection for wireless communication of electronic device 2 200 to an external network based on the release of the connection for direct communication (e.g., operation 1021). For example, electronic device 1 101 may transmit, to electronic device 2 200, a request message associated with release of the additional connection based on the release of the connection for direct communication with electronic device 2 200. Electronic device 1 101 may transmit the request message associated with release of the additional connection for change of an AP of electronic device 2 200 and then maintain the additional connection with electronic device 2 200 for a designated time period. In case that the designated time period has elapsed, electronic device 1 101 may release the additional connection with electronic device 2 200. For example, electronic device 2 200 may search for an AP for electronic device 2 200 to access, based on reception of the request message associated with the release of the additional connection. In case that the AP for electronic device 2 200 to access is searched, electronic device 2 200 may release the additional connection with electronic device 1 101 and access a new AP. For example, the request message associated with release of the additional connection may be received through the additional connection with electronic device 1 101 or an OOB method.

Figure 11:
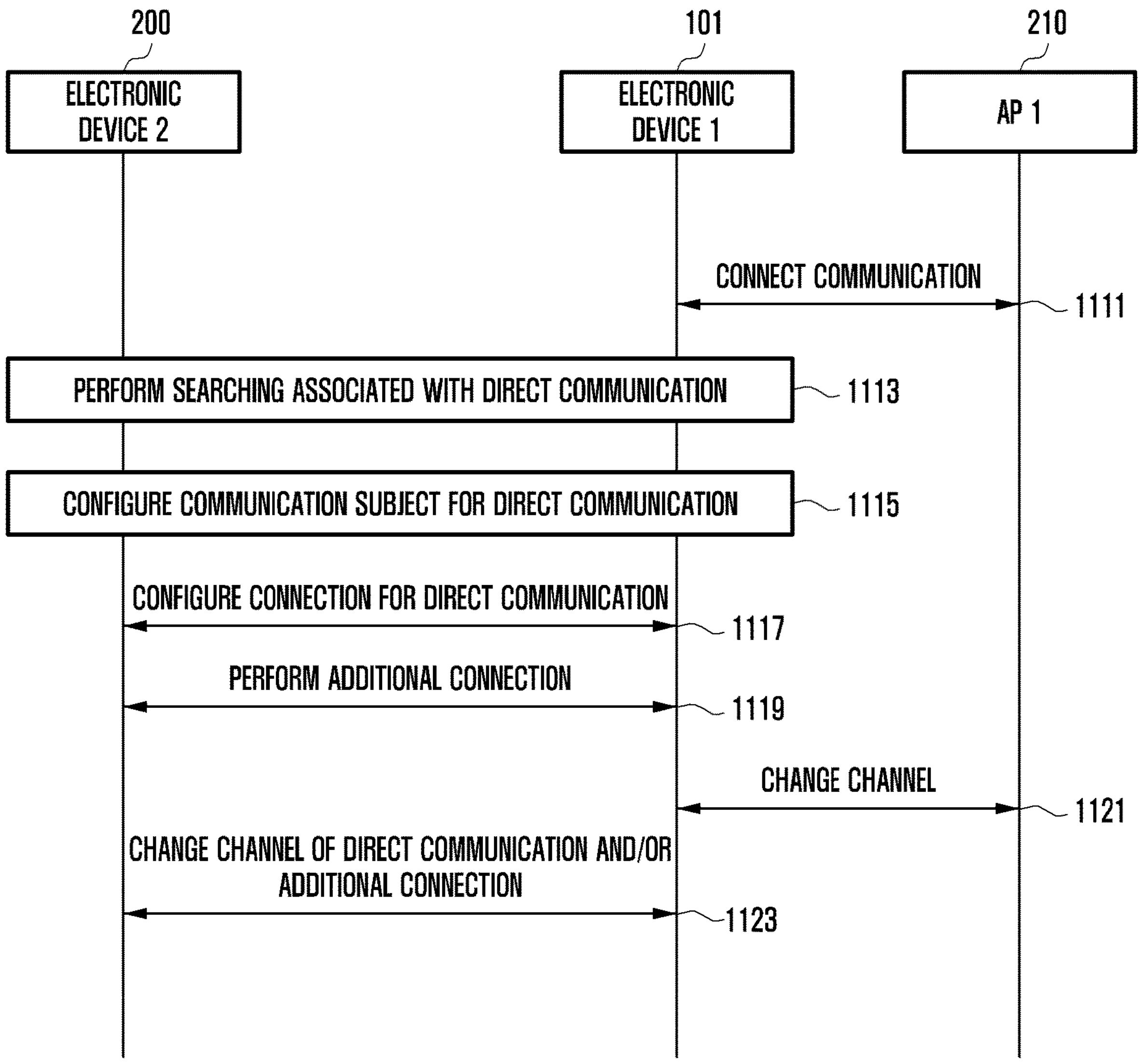
FIG. 11 is an example illustrating changing of a channel for wireless communication with electronic device 2 in electronic device 1 according to an embodiment.

FIG. 11 is an example illustrating changing of a channel for wireless communication with electronic device 2 in electronic device 1 according to an embodiment.

According to an embodiment referring to FIG. 11, electronic device 1 101 may access AP 1 210 based on a wireless LAN (e.g., operation 1111).

According to an embodiment, electronic device 1 101 may perform searching associated with direct communication (e.g., operation 1113). For example, in case that occurrence of an event associated with direct communication is detected, electronic device 1 101 may perform searching associated with direct communication. By way of example, the searching associated with direct communication may include a series of operations of identifying whether there is another electronic device (e.g., electronic device 2 200) for performing direct communication with electronic device 1 101.

According to an embodiment, in case that electronic device 2 200 is detected through the searching for direct communication, electronic device 1 101 may configure a communication subject (e.g., the group owner) for direct communication with electronic device 2 200 (e.g., operation 1115). For example, electronic device 1 101 and electronic device 2 200 may determine (or select) an electronic device having a relatively higher group owner variable (e.g., a group owner intent) as the group owner through negotiation associated with the group owner. For example, the group owner variable may be configured that a device supporting a cross connection has a relatively higher value. By way of example, electronic device 1 101 and electronic device 2 200 may determine (or select) an electronic device supporting a cross connection as the group owner among electronic device 1 101 and electronic device 2 200 without negotiation associated with the group owner. For example, the cross connection may include a series of operations in which an electronic device having been configured as the group owner among electronic devices connected to direct communication shares, with another electronic device configured as a group client (e.g., GC), a network (e.g., a cellular network or a wireless LAN network) with an external electronic device. For example, the group owner may include a main device controlling direct communication between electronic device 1 101 and electronic device 2 200 performing the direct communication.

According to an embodiment, electronic device 1 101 and electronic device 2 200 may configure a connection for direct communication (e.g., operation 1117). For example, in case that electronic device 1 101 is configured as the group owner, a second channel for direct communication with electronic device 2 200 may be configured based on a first channel with AP 1 210 which electronic device 1 101 accesses. Electronic device 1 101 may perform at least one of transmission or reception of data to or from electronic device 2 200 through the second channel. By way of example, the second channel may include a channel identical to the first channel with AP 1 210 in case that electronic device 1 101 is configured as the group owner.

According to an embodiment, electronic device 1 101 and electronic device 2 200 may perform an additional connection for wireless communication of electronic device 2 200 to an external network (e.g., operation 1119). For example, electronic device 1 101 and electronic device 2 200 may determine that electronic device 1 101 satisfies a condition for the additional connection with electronic device 2 200, and in case that electronic device 2 200 selects electronic device 1 101 as an AP for wireless communication with an external network, perform the additional connection. For example, electronic device 1 101 may perform the additional connection with electronic device 2 200 through a first communication protocol for direct communication. For example, electronic device 2 200 may perform the additional connection with electronic device 1 101 through a second communication protocol different from the first communication protocol for direct communication. By way of example, the state in which the condition for the additional connection with electronic device 2 200 is satisfied may include a state in which electronic device 1 101 is configured as the group owner and a state in which electronic device 1 101 supports a cross connection. By way of example, the state in which the condition for the additional connection with electronic device 2 200 is satisfied may include a state in which electronic device 1 101 is configured as the group owner, a state in which electronic device 1 101 supports a cross connection, and a state in which electronic device 2 200 is included in a cross connection activation group. By way of example, the cross connection activation group may correspond to a list of electronic devices that are allowed to cross-connect with electronic device 1 101 and may include at least one electronic device that is determined to have an account identical to electronic device 1 101, and a family relationship or a friendship relationship with a user of electronic device 1 101. By way of example, the selection of the AP for wireless communication with the external network may include a series of operations in which electronic device 1 101 configured as the group owner and supporting a cross connection is selected. For example, in case that the channel for wireless communication with AP 2 220 which electronic device 2 200 accesses and the channel for direct communication with electronic device 1 101 are different from each other, the selection of the AP for wireless communication with the external network may include a series of operations in which electronic device 1 101 supporting a cross connection is selected. For example, in case that the communication quality of the case of using AP 2 220 which electronic device 2 200 accesses does not satisfy a designated condition, the selection of the AP for wireless communication with the external network may include a series of operations in which electronic device 1 101 supporting a cross connection is selected. For example, the state that does not satisfy the designated condition may include a case in which the communication quality when using AP 2 220 is lower than that when using electronic device 1 101 as an AP, or a case in which the communication quality when selecting AP 2 220 is equal to or less than a designated reference quality. For instance, the communication quality may include at least one of a received signal strength indicator (RSSI), a reference signal received quality (RSRQ), reference signal received power (RSRP), a signal to interference and noise ratio (SINR), a quality of service (QOS), or a bit error rate (BER).

According to an embodiment, electronic device 1 101 may change the channel for wireless communication with AP 1 210 (e.g., operation 1121). By way of example, the change of the channel for wireless communication with AP 1 210 may include a series of operations in which electronic device 1 101 accesses an AP (e.g., AP 2 220 in FIG. 2B) using a channel different from that of AP 1 210 for wireless communication.

According to an embodiment, electronic device 1 101 and electronic device 2 200 may change a channel for the additional connection and/or the connection for direct communication therebetween based on the change of the channel for wireless communication of electronic device 1 101 with AP 1 210 (e.g., operation 1123). For example, electronic device 1 101 may transmit, to electronic device 2 200, a request message associated with the change of the channel based on the change of the channel with AP 1 210. For example, in case that a designated time period has elapsed from a time point at which the request message associated with channel change has transmitted, electronic device 1 101 may change at least one channel of the additional connection or the connection for direct communication with electronic device 2 200. For example, in case that an acceptance message corresponding to the request message associated with channel change is received, electronic device 1 101 may change at least one channel of the additional connection or the connection for direct communication with electronic device 2 200. For example, electronic device 2 200 may change at least one channel of the additional connection or the connection for direct communication with electronic device 1 101 based on the information associated with channel change, included in the request message associated with the channel change.

According to an embodiment, an operating method of an electronic device (e.g., the electronic device 101 in FIG. 1 or electronic device 2 200 in FIG. 2A, 2B or 3) may include an operation of configuring the electronic device as a group client for direct communication with an external electronic device configured as a group owner. According to an embodiment, the operating method of the electronic device may include an operation of establishing, in a state in which a first connection for direct communication with the external electronic device has been established through a first communication protocol and the external electronic device supports a cross connection, a second connection with the external electronic device for communication with an external network through a first AP to which the external electronic device is connected.

According to an embodiment, the operation of establishing the second connection may include an operation of establishing the second connection with an external electronic device through a second communication protocol different from the first communication protocol.

According to an embodiment, the operation of establishing the second connection may include an operation of selecting the external electronic device from among the external electronic device and at least one AP to which the electronic device is connected, and establishing the second connection with the external electronic device.

According to an embodiment, the operation of establishing the second connection may include an operation of identifying a channel of a communication connection with a second AP and a channel of a first connection in case that the electronic device has established the communication connection with the second AP, an operation of selecting the external electronic device from among the second AP and the external electronic device in case that the channel of the communication connection with the second AP and the channel of the first connection are different from each other, and an operation of establishing the second connection with the external electronic device.

According to an embodiment, the operation of establishing the second connection may include an operation of identifying a communication quality with a second AP in case that the electronic device has established a communication connection with the second AP, an operation of selecting the external electronic device from among the second AP and the external electronic device in case that the communication quality with the second AP does not satisfy a designated quality condition, and an operation of establishing the second connection with the external electronic device.

According to an embodiment, the operation of selecting the external electronic device may include an operation of identifying a communication quality with the external electronic device and an operation of selecting the external electronic device from among the second AP and the external electronic device in case that the communication quality with the external electronic device is higher than the communication quality with the second AP.

According to an embodiment, at least one of the channel of the first connection or the channel of the second connection may be changed based on change of a channel of connection between the external electronic device and the first AP.

According to an embodiment, the second connection with the external electronic device may be released based on release of the first connection with the external electronic device.

According to an embodiment, the operating method of the electronic device may include an operation of configuring a group owner for direct communication with the second external electronic device in case that a second external electronic device is detected in a state in which the electronic device is connected to the second AP, an operation of establishing a third connection with the second external electronic device through the first communication protocol in case that the electronic device is configured as the group owner for direct communication with the second external electronic device, and an operation of establishing a fourth connection with the second external electronic device for communication of the second external electronic device with an external network through the first communication protocol.

The embodiments of the disclosure described and shown in the specification and the drawings are merely specific examples that have been presented to easily explain the technical contents of embodiments of the disclosure and help understanding of embodiments of the disclosure, and are not intended to limit the scope of embodiments of the disclosure. Therefore, the scope of an embodiment of the disclosure should be construed to include, in addition to the embodiments set forth herein, all changes and modifications derived based on the technical idea of an embodiment of the disclosure.

What is claimed is:

1. An electronic device (200) comprising:

a communication circuit (192 or 312) configured to support wireless LAN communication;

at least one processor (120 or 310) including processing circuitry and operatively connected to the communication circuit (192 or 312); and a memory (130 or 314) operatively connected to the at least one processor (120 or 310) and storing instructions which, when executed by the at least one processor (120 or 310) individually or collectively, cause the electronic device (200) to:

allow to be configured as a group client for direct communication with an external electronic device (101) configured as a group owner; and in a state in which a first connection for the direct communication with the external electronic device (101) has been established through a first communication protocol of the communication circuit (192 or 312) and the external electronic device (101) supports a cross connection, establish a second connection with the external electronic device (101) for communication with an external network through a first access point (AP) to which the external electronic device (101) is connected.

2. The electronic device of claim 1, wherein the instructions which, when executed by the at least one processor (120 or 310), individually or collectively, cause the electronic device (200) to establish the second connection with the external electronic device (101) through a second communication protocol different from the first communication protocol of the communication circuit (192 or 312).

3. The electronic device of claim 1, wherein the instructions which, when executed by the at least one processor (120 or 310), individually or collectively, cause the electronic device (200) to:

select the external electronic device (101) from among the external electronic device (101) and at least one AP to which the electronic device (200) is connectible; and establish the second connection with the external electronic device (101).

4. The electronic device of claim 1, wherein the instructions which, when executed by the at least one processor (120 or 310), individually or collectively, cause the electronic device (200) to:

in case that the electronic device (200) has established a communication connection with a second AP, identify a channel of the connection with the second AP and a channel of the first connection;

in case that the channel of the connection with the second AP and the channel of the first connection are different from each other, select the external electronic device (101) from among the second AP and the external electronic device (101); and establish the second connection with the external electronic device (101).

5. The electronic device of claim 1, wherein the instructions which, when executed by the at least one processor (120 or 310), individually or collectively, cause the electronic device (200) to:

in case that the electronic device (200) has established a communication connection with a second AP, identify a communication quality with the second AP;

in case that the communication quality with the second AP does not satisfy a designated quality condition, select the external electronic device (101) from among the second AP and the external electronic device (101); and establish the second connection with the external electronic device (101).

6. The electronic device of claim 5, wherein the communication quality includes at least one of a received signal strength indicator (RSSI), a reference signal received quality (RSRQ), reference signal received power (RSRP), a signal to interference and noise ratio (SINR), a quality of service (QOS), or a bit error rate (BER).

7. The electronic device of claim 5, wherein the instructions which, when executed by the at least one processor (120 or 310), individually or collectively, cause the electronic device (200) to:

identify a communication quality with the external electronic device (101);

in case that the communication quality with the external electronic device (101) is higher than the communication quality with the second AP, select the external electronic device (101) from among the second AP and the external electronic device (101); and establish the second connection with the external electronic device (101).

8. The electronic device of claim 1, wherein at least one of a channel of the first connection or a channel of the second connection is changed based on change of a channel of connection between the external electronic device (101) and the first AP.

9. The electronic device of claim 1, wherein the second connection with the external electronic device (101) is released based on release of the first connection with the external electronic device (101).

10. An operating method of an electronic device (200), the method comprising:

allowing, for the electronic device, to be configured as a group client for direct communication with an external electronic device (101) configured as a group owner; and in a state in which a first connection for the direct communication with the external electronic device (101) has been established through a first communication protocol and the external electronic device (101) supports a cross connection, establishing a second connection with the external electronic device (101) for communication with an external network through a first AP to which the external electronic device (101) is connected.

11. The method of claim 10, wherein the establishing of the second connection comprises establishing the second connection with the external electronic device (101) through a second communication protocol different from the first communication protocol.

12. The method of claim 10, wherein the establishing of the second connection comprises:

selecting the external electronic device (101) from among the external electronic device (101) and at least one AP to which the electronic device (200) is connectible; and establishing the second connection with the external electronic device (101).

13. The method of claim 10, wherein the establishing of the second connection comprises:

in case that the electronic device (200) has established a communication connection with a second AP, identifying a channel of the connection with the second AP and a channel of the first connection;

in case that the channel of the connection with the second AP and the channel of the first connection are different from each other, selecting the external electronic device (101) from among the second AP and the external electronic device (101); and establishing the second connection with the external electronic device (101).

14. The method of claim 10, wherein the establishing of the second connection comprises:

in case that the electronic device (200) has established a communication connection with a second AP, identifying a communication quality with the second AP;

in case that the communication quality with the second AP does not satisfy a designated quality condition, selecting the external electronic device (101) from among the second AP and the external electronic device (101); and establishing the second connection with the external electronic device (101).

15. The method of claim 14, wherein the communication quality includes at least one of a received signal strength indicator (RSSI), a reference signal received quality (RSRQ), reference signal received power (RSRP), a signal to interference and noise ratio (SINR), a quality of service (QOS), or a bit error rate (BER).

16. The method of claim 14, wherein the selecting of the external electronic device (101) comprises:

identifying a communication quality with the external electronic device (101); and in case that the communication quality with the external electronic device (101) is higher than the communication quality with the second AP, selecting the external electronic device (101) from among the second AP and the external electronic device (101).

17. The method of claim 10, wherein at least one of a channel of the first connection or a channel of the second connection is changed based on change of a channel of connection between the external electronic device (101) and the first AP.

18. The method of claim 10, wherein the second connection with the external electronic device (101) is released based on release of the first connection with the external electronic device (101).

19. An electronic device (101) comprising:

a communication circuit (192 or 302) configured to support wireless LAN communication;

at least one processor (120 or 300) including processing circuitry and operatively connected to the communication circuit (192 or 302); and a memory (130 or 304) operatively connected to the at least one processor (120 or 300) and storing instructions which, when executed by the at least one processor (120 or 300) individually or collectively, cause the electronic device (101) to:

allow to be configured as a group owner for direct communication with an external electronic device (200) configured as a group client; and in a state in which a first connection for the direct communication with the external electronic device (200) has been established through a first communication protocol of the communication circuit (192 or 302) and the electronic device (101) supports a cross connection, establish a second connection with the external electronic device (200) for communication with an external network through a first AP to which the electronic device (101) is connected.

20. The electronic device of claim 19, wherein at least one of a channel of the first connection or a channel of the second connection is changed based on change of a channel of connection between the electronic device (101) and the first AP.

* * * * *